United States Patent
Hill

(10) Patent No.: US 8,524,190 B2
(45) Date of Patent: Sep. 3, 2013

(54) ENHANCED HEXAGONAL FERRITE MATERIAL AND METHODS OF PREPARATION AND USE THEREOF

(75) Inventor: Michael Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 850 days.

(21) Appl. No.: 12/130,800

(22) Filed: May 30, 2008

(65) Prior Publication Data

US 2009/0297432 A1 Dec. 3, 2009

(51) Int. Cl.
*C01D 1/02* (2006.01)
(52) U.S. Cl.
USPC ........ 423/594.2; 423/632; 52/62.62; 502/330
(58) Field of Classification Search
USPC .............. 333/158; 502/330; 423/594.2, 632; 252/62.62
See application file for complete search history.

(56) References Cited

U.S. PATENT DOCUMENTS

| | | | |
|---|---|---|---|
| 4,957,812 A | 9/1990 | Aoki et al. | |
| 4,997,461 A | 3/1991 | Markhoff-Matheny et al. | |
| 5,874,509 A * | 2/1999 | Shalaby et al. | 526/194 |
| 6,677,901 B1 | 1/2004 | Nalbandian | |
| 2002/0160693 A1 | 10/2002 | Nihonmatsu et al. | |
| 2003/0052298 A1* | 3/2003 | Wang et al. | 252/62.6 |
| 2006/0219974 A1 | 10/2006 | Kato | |
| 2008/0036671 A1 | 2/2008 | Gonda et al. | |

FOREIGN PATENT DOCUMENTS

| | | |
|---|---|---|
| EP | 0332990 A2 | 9/1989 |
| EP | 1798211 A1 | 6/2007 |
| JP | 2006076872 A * | 3/2006 |
| JP | 2007119321 A * | 5/2007 |
| KR | 1019910006451 A | 4/1991 |
| KR | 1019940001291 A | 1/1994 |
| KR | 1020020018186 A | 3/2002 |
| KR | 20050053081 A | 6/2005 |
| WO | 9615078 A1 | 5/1996 |
| WO | 2004103909 A1 | 12/2004 |
| WO | 2006064839 A1 | 6/2006 |
| WO | 2010047723 A1 | 4/2010 |

OTHER PUBLICATIONS

Fay et al., Operation of the Ferrite Junction Circulator, 1965, pp. 15-27.*
Kammerer et al., Material properties and RF applications of high k and ferrite LTCC ceramics, 2006, Microelectrics Reliability, 46, 134-143.*
International Search Report and Written Opinion from corresponding International Application No. PCT/US2009/045176 dated, Jan. 11, 2010.
Loehman, "Ceramics," vol. 5, pp. 599-633 (publication date unknown).

(Continued)

*Primary Examiner* — Kaj K Olsen
*Assistant Examiner* — Pritesh Darji
(74) *Attorney, Agent, or Firm* — Lando & Anastasi, LLP

(57) ABSTRACT

Embodiments and aspects of the present invention relate to an enhanced hexagonal ferrite magnetic material doped with an alkali metal. The material retains substantial magnetic permeability up to frequencies in the GHz range with low losses. The material may be used in high frequency applications in devices such as transformers, inductors, circulators, and absorbers.

21 Claims, 21 Drawing Sheets

(56) References Cited

OTHER PUBLICATIONS

Baker-Jarvis, et al., "Dielectric and Conductor-Loss Characterization and Measurements on Electronic Packaging Materials," NIST Technical Note 1520, Technology Administration, U.S. Department of Commerce, Jul. 2001.

International Preliminary Report on Patentability issued Apr. 26, 2011 and the International Written Opinion mailed Feb. 25, 2009 from related International Application No. PCT/US2008/086969.

Zhang et al, "Low-Temperature Sintering and Electromagnetic Properties of Copper-Modified Z-type Hexaferrite," Journal of the American Ceramic Society, 2002, pp. 1180-1184, vol. 85, No. 5.

Nakamura et al., "Control of High-Frequency Permeability in Polycrystalline (Ba,Co)-Z-type Hexagonal Ferrite," Journal of Magnetism and Magnetic Materials, 2003, pp. 158-164, vol. 257.

Wang et al., "Preparation and Magnetic Characterization of the Ferroxplana Ferrites Ba3Co2-xZnxFe24O41," Journal of Magnetism and Magnetic Materials, 2002, pp. 434-439, vol. 246.

Zhang et al., "Microstructure Characterization and Properties of Chemically Synthesized Co2Z Hexaferrite," Journal of the European Ceramic Society, 2001, pp. 149-153, vol. 21.

Zhang et al., "Microstructure Study and Hyper Frequency Electromagnetic Characterization of Novel Hexagonal Compounds," Microelectronics Journal, 2003, pp. 281-287, vol. 34.

Takada et al., "Crystal and Magnetic Structures and Their Temperature Dependence of CO2Z-Type Hexaferrite (Ba, Sr)3CO2Fe24O41 by High-Temperature Neutron Diffraction," Journal of Applied Physics, 2006, pp. 043904-1-043904-7, vol. 100.

Zhang et al., "Investigation on Physical Characteristics of Novel Z-Type Ba3Co2(0.8-x)Cuo.40Zn2xFe24O41 Hexaferrite," Materials Letters, 2002, pp. 397-403, vol. 56.

Zhang et al., "The Effect on Zn ion Substitution on Electromagnetic Properties of Low-Temperature Fired Z-Type Hexaferrite," Ceremics International, 2002, pp. 917-923, vol. 28.

Tachibana et al., "X-Ray and Neutron Diffraction Studies on Iron-Substituted Z-Type Hexagonal Barium Ferrite: Ba3Co2-xFe24+xO41 (x=0-0.6)," Journal of Magnetism and Magnetic Materials, 2003, pp. 248-257, vol. 262.

Zhang et al., "Low-Temperature Sintering, Densification, and Properties of Z-type Hexaferrite with Bi2O3 Additives," Journal of the American Ceramic Society, 2001, pp. 2889-2894, vol. 84, No. 12.

Bao et al., "Dielectric Behavior of Mn-Substituted Co2Z Hexaferrites," Journal of Magnetism and Magnetic Materials, 2002, pp. 131-137, vol. 250.

Wang et al., "Preparation and Characterizations of Ultrafine Hexaganoal Ferrite Co2Z Powders," ScienceDirect, Materials Chemistry and Physics, vol. 77, 2002, pp. 248-253.

Examination Report for GB1021566.3, dated Feb. 2, 2012.

* cited by examiner

ENHANCED HEXAGONAL FERRITE MATERIAL AND METHODS OF PREPARATION AND USE THEREOF

BACKGROUND OF INVENTION

Embodiments and aspects of the present invention are directed toward magnetic materials suitable for use in high frequency applications, methods of making these materials, and to devices including these materials.

Discussion of Related Art

Certain electrical devices used in high frequency applications (e.g., 800 MHz-2.5 GHz), such as transformers, inductors, circulators, and absorbers, may utilize a magnetic material such as a ceramic ferrite to enable or to enhance their functionality.

Various hexagonal ferrite materials have been utilized as components of devices such as, for example, high frequency inductors. These materials are generally combinations of barium or strontium, a divalent transition metal element such as Ni, Co, Mn, Zn, or Fe, and trivalent iron oxide. These compounds may form in a variety of crystal structures based on the magnetoplumbite cell, commonly denoted as M-phase, W-phase, Y-phase, Z-phase, X-phase, or U-phase.

One magnetic material which exhibits high magnetic permeability at frequencies up to about 500 MHz is barium cobalt ferrite Z-phase ($Ba_3Co_2Fe_{24}O_{41}$) which is commonly abbreviated as $Co_2Z$.

SUMMARY OF INVENTION

A class of materials according to some embodiments and aspects of the present invention may facilitate superior operating characteristics electrical devices operating at high frequencies. Doping $Co_2Z$ with small amounts of an alkali metal, such as potassium, sodium, or rubidium facilitates retention of a significant magnetic permeability at high frequencies versus what has been previously obtained for $Co_2Z$ based materials. The magnetic permeability of the material is retained with reasonable losses at much higher frequencies compared to unmodified ferrites. This expands the frequency related limitation in devices such as, for example, inductors or antennae.

According to one embodiment of the present invention there is provided a compound comprising an alkali metal-doped hexaferrite. In accordance with one or more aspects of the present invention, this compound has the formula $Ba_{3-y}M_xCo_2Fe_{24}O_{41}$, wherein x is in a range of from between 0 to about 1, y is less than about 1, and M is one or more alkali metals. According to one or more aspects, M is an alkali metal selected from the group consisting of sodium, potassium, and rubidium. According to some aspects, the alkali metal-doped hexaferrite comprises $Ba_3Co_2Fe_{24}O_{41}$ doped with up to about 1 weight percent of an alkali metal, wherein the alkali metal is at least one of potassium, sodium, and rubidium. According to some aspects, the average grain diameter of the compound is in a range of between about 5 micrometers and about 1 millimeter. According to further aspects, the alkali metal-doped hexaferrite comprises a Z-type ferrite and at least one compound selected from the group consisting of sodium oxide, potassium oxide, and rubidium oxide.

According to another embodiment of the present invention, there is provided an electrical component comprising $Ba_3Co_2Fe_{24}O_{41}$ doped with up to about 1 weight percent of an alkali metal oxide. According to one or more aspects, the electrical component is a radio frequency ferrite circulator, which according to one or more aspects is configured as an isolator. According to one or more other aspects, the electrical component is any one of an inductor, a transformer, and an antenna.

According to a further embodiment, there is provided a method of producing a hexaferrite. The method comprises providing a precursor mixture comprising a barium source, a cobalt source, and an iron source, introducing an alkali metal source to the precursor mixture to produce an alkali metal containing mixture, and heating the alkali metal containing mixture at a first temperature of at least about 1100° C. for a first period of time sufficient to form hexaferrite particles. According to one or more aspects, this method further comprises exposing the precursor mixture to an oxygen source. According to some aspects, the oxygen source comprises at least one oxygen containing compound of any of barium, cobalt, iron, and an alkali metal. According to some aspects, the oxygen source comprises a gas. According to further aspects, the first temperature is in a range of from about 1100° C. to about 1300° C. and the first period is in a range of from about two hours to about 12 hours. According to some aspects, the method further comprises milling the hexaferrite particles to a powder having a median particle diameter in the range of from about one micrometer to about four micrometers. According to one or more aspects, the method further comprises heating the powder at a second temperature in a range of from about 1150° C. to about 1450° C. for a second period of time sufficient to form sintered hexaferrite in a range of from about two hours to about 12 hours. According to some aspects, heating the powder comprises heating the powder under an atmosphere having an absolute oxygen partial pressure in a range of from about 0.003 pounds per square inch to about 20 pounds per square inch and according to some aspects, heating the powder comprises heating the powder in an environment with a heating rate of between about 20° C. per hour and 200° C. per hour. According to some aspects, the method further comprises cooling the sintered hexaferrite in an environment which cools at a rate of about 80° C. per hour after heating the powder.

According to some aspects, heating the alkali metal containing mixture comprises heating the alkali metal containing mixture under an atmosphere having an absolute oxygen partial pressure in a range of from about 0.003 pounds per square inch to about 20 pounds per square inch and according to some aspects, heating the alkali metal containing mixture comprises heating the alkali metal containing mixture in an environment with a heating rate of between about 20° C. per hour and 200° C. per hour.

According to another embodiment, there is provided a method of producing a hexaferrite. The method comprises providing a mixture comprising a barium source, a cobalt source, and an iron source, calcining the mixture at a temperature that is at least about 1100° C. for a period of time sufficient to form hexaferrite particles, and introducing an alkali metal to the hexaferrite particles. According to one or more aspects, the method of preparing a doped hexaferrite comprises doping $Ba_3Co_2Fe_{24}O_{41}$ with at least one alkali metal compound in an amount sufficient to provide doped hexaferrite having at least one desired magnetic characteristic. According to some aspects, doping $Ba_3Co_2Fe_{24}O_{41}$ comprises doping $Ba_3Co_2Fe_{24}O_{41}$ with at least one alkali metal compound in an amount sufficient to increase a frequency corresponding to a peak of a real component of magnetic permeability of the doped hexaferrite. According to some aspects, doping $Ba_3Co_2Fe_{24}O_{41}$ comprises introducing at least one alkali metal compound to $Ba_3Co_2Fe_{24}O_{41}$ in an amount sufficient to increase a frequency corresponding to a peak imaginary component of magnetic permeability of the doped hexaferrite. According to some aspects, doping $Ba_3Co_2Fe_{24}O_{41}$ comprises doping $Ba_3Co_2Fe_{24}O_{41}$ with at least one alkali metal compound in an amount sufficient to increase a permeability to permittivity ratio $\mu_r/\in_r$ of the doped hexaferrite at a frequency of at least one of about 0.5 GHz and about 1 GHz, relative to un-doped $Ba_3Co_2Fe_{24}O_{41}$. According to some aspects, doping $Ba_3Co_2Fe_{24}O_{41}$ comprises doping $Ba_3Co_2Fe_{24}O_{41}$ with at least one alkali metal compound in an amount sufficient to provide the doped hexaferrite with a permeability to permittivity ratio $\mu_r/\in_r$ of greater than about 0.8 at a frequency of at least one of about 0.5 GHz and about 1 GHz. According to some aspects, doping $Ba_3Co_2Fe_{24}O_{41}$ comprises doping $Ba_3Co_2Fe_{24}O_{41}$ with at least one alkali metal compound in an amount sufficient to impart the doped hexaferrite with a real component of relative magnetic permeability, at a frequency above 1 GHz, greater than that of un-doped $Ba_3Co_2Fe_{24}O_{41}$. According to some aspects, doping $Ba_3Co_2Fe_{24}O_{41}$ comprises doping $Ba_3Co_2Fe_{24}O_{41}$ with at least one alkali metal compound in an amount sufficient to impart the doped $Ba_3Co_2Fe_{24}O_{41}$ with a real component of relative magnetic permeability greater than about 10 at a frequency above 1 GHz. According to some aspects, doping $Ba_3Co_2Fe_{24}O_{41}$ comprises doping $Ba_3Co_2Fe_{24}O_{41}$ with at least one alkali metal compound in an amount sufficient to impart the doped hexaferrite with a resonant frequency greater than that of un-doped $Ba_3Co_2Fe_{24}O_{41}$. According to some aspects, doping $Ba_3Co_2Fe_{24}O_{41}$ comprises doping $Ba_3Co_2Fe_{24}O_{41}$ with at least one alkali metal compound in an amount sufficient to impart the doped hexaferrite with a resonant frequency greater than 1 GHz.

BRIEF DESCRIPTION OF DRAWINGS

Various aspects of at least one embodiment are discussed below with reference to the accompanying drawings. In the drawings, each identical or nearly identical component that is illustrated in various drawings is represented by a like numeral. For purposes of clarity, not every component may be labeled in every drawing. The drawings are provided for the purposes of illustration and explanation, and are not intended as a definition of the limits of the invention. In the drawings.

DETAILED DESCRIPTION

Figure 1:
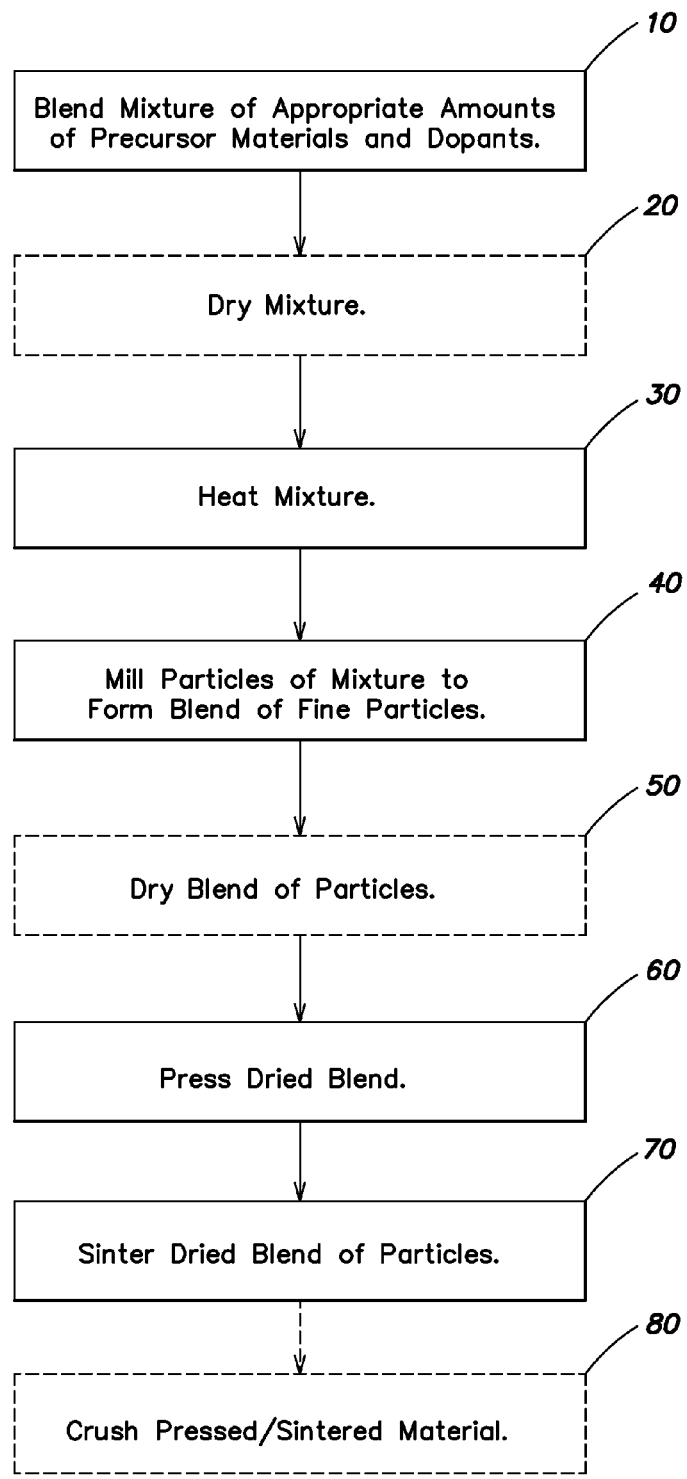
FIG. 1 is a flow chart of a method of forming a material according to an embodiment of the present invention.

It is to be appreciated that embodiments of the materials, methods, and apparatuses discussed herein are not limited in application to the details of construction and the arrangement of components set forth in the following description or illustrated in the accompanying drawings. The materials, methods, and apparatuses are capable of implementation in other embodiments and of being practiced or of being carried out in various ways. Examples of specific implementations are provided herein for illustrative purposes only and are not intended to be limiting. In particular, acts, elements, and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

The present invention provides enhanced performance of devices used in high frequency applications, such as transformers, inductors, circulators, and absorbers which utilize a magnetic material such as a ceramic ferrite by enhancing one or more of their operating properties at high frequencies. The materials disclosed herein exhibit, inter alia, desirable characteristics, such as improved magnetic permeability, while exhibiting low magnetic loss tangent at high frequencies, which enables the enhancement of high frequency operating characteristics of devices utilizing these materials.

The magnetic characteristics of certain materials may be adjusted by the addition of impurities to an otherwise pure form of the material. These impurities are often referred to as dopants. The addition of certain dopants to certain magnetic materials may result in changes to properties of the magnetic material such as magnetic moment, magnetic permeability, electrical permittivity, magnetic loss tangent, and peak magnetization.

Some aspects of the present invention are directed to compounds comprising alkali-metal doped hexaferrite. According to some aspects, the compound can consist of or consist essentially of a hexaferrite and an alkali metal or an alkali metal oxide. In still other aspects, the compound comprises a hexaferrite without a divalent dopant.

A material suitable for use in high frequency inductors and other devices such as, for example, transformers, circulators, isolators, antennae, and absorbers operating at high frequencies, may be formed from a mixture of barium, cobalt, iron, oxygen, and one or more alkali metals. This material may have a composition similar to that of $Co_2Z$, but with a sufficient amount of one or more dopants that advantageously provide one or more desirable characteristics. In some embodiments, the dopant may replace a portion of the barium atoms in the $Co_2Z$ crystal lattice, and may also, or alternatively, integrate into the crystal lattice, for example, in interstitial sites, resulting in a compound with an aggregate formulaic representation of $Ba_{3-y}M_xCe_2Fe_{24}O_{41}$, where M is one or more alkali metals, x is between zero and about one, and y is less than or equal to x. In some embodiments, the compound may include portions with an aggregate formulaic representation of $Ba_{3-y}M_xCo_2Fe_{24}O_{41+0.5x}$ and/or $(Ba_3Co_2)_{1-x}M_xCo_2Fe_{24}O_{41+0.5x}$.

In some aspects, the compound may comprise a Z-phase crystal lattice with other phases, for example, Y and/or M phases also present in concentrations of, for example, from about two molar percent to about ten molar percent.

In some embodiments, one or more dopants may be present in the crystal matrix as oxides. Without being bound to a particular theory, it is believed that the addition or incorporation of one or more alkali metal containing dopants into the $Co_2Z$ matrix or crystal structure thereof can prevent or inhibit the reduction of iron from the $Fe^{3+}$ to the $Fe^{2+}$ state during preparation thereof, allowing the produced material to exhibit a desirable magnetic permeability with a relatively low magnetic loss tangent, at frequencies higher than un-doped $Co_2Z$.

Some aspects of the invention may relate to techniques for preparing doped hexaferrites. A method of forming a magnetic material according to some aspects of the present invention is exemplarily illustrated in FIG. 1. In the first step of this method, designated step 10, appropriate amounts of precursor materials—reactants that may provide barium, cobalt, iron, one or more alkali metals, and oxygen that can form the magnetic material—are mixed together. In some aspects, at least a portion of the oxygen may be provided in the form of an oxygen-containing compound of barium (Ba), cobalt (Co), iron (Fe), or one or more alkali metals. For example, these elements may be provided in carbonate or oxide forms, or in other oxygen-containing precursor forms known in the art. In one or more aspects, one or more precursor materials may be provided in a non-oxygen-containing compound, or in a pure elemental form. In other aspects, oxygen could be supplied from a separate compound, such as, for example, $H_2O_2$, or from gaseous oxygen or air.

For example, in one aspect, $BaCO_3$, $Co_3O_4$, and $Fe_2O_3$ precursors are mixed in a ratio appropriate for the formation of $Co_2Z$ (for example, about 22 wt. % $BaCO_3$, about 6 wt. % $Co_3O_4$, and about 72 wt. % $Fe_2O_3$) along with between about 0.06 wt. % and about 3.6 wt. % $K_2CO_3$. These precursor compounds may be mixed or blended in water or alcohol using, for example, a Cowles mixer, a ball mill, or a vibratory mill. These precursors may also be blended in a dry form.

The blended mixture may then be dried if necessary (step 20). The mixture may be dried in any of a number of ways, including, for example, pan drying or spray drying. The dried mixture may then be heated (step 30) at a temperature and for a period of time to promote calcination. For example, the temperature in the heating system used in heating step 30 may increase at a rate of between about 20° C. per hour and about 200° C. per hour to achieve a soak temperature of about 1100° C.-1300° C. which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution.

The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 40, the agglomerated particles may be milled Milling may take place in water, in alcohol, in a ball mill, a vibratory mill, or other milling apparatus. In some aspects, the milling is continued until the median particle diameter of the resulting powdered material is from about one to about four micrometers, although other particle sizes, for example, from about one to about ten microns in diameter, may be acceptable in some applications. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles.

In some methods, one or more alkali metals or alkali metal precursors or other dopant materials may be added at this point (step 40) rather than, or in addition to, in step 10.

The powdered material may be dried if necessary (step 50) and the dried powder may be pressed into a desired shape using, for example, a uniaxial press or an isostatic press (step 60). The pressure used to press the material may be, for example, up to 80,000 N/m$^2$, and is typically in the range of from about 20,000 N/m$^2$ to about 60,000 N/m$^2$. A higher pressing pressure may result in a more dense material subsequent to further heating than a lower pressing pressure.

In step 70, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions of the invention may promote formation of the sintered doped hexaferrite with little or minimal iron reduction. According to some aspects, the temperature in the heating system used in the sintering step 70 may be increased at a rate of between about 20° C. per hour and about 200° C. per hour to achieve a soak temperature of about 1150° C.-1450° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some aspects of methods according to the present invention, the density range of the sintered hexaferrite may be between about 4.75 g/cm$^3$ and about 5.36 g/cm$^3$. A desired magnetic permeability of the doped hexaferrite may also be achieved by tailoring the heat treatment of the material to produce grains with desired sizes.

The grain size of material produced by embodiments of the above method may vary from between about five micrometers and one millimeter in diameter depending upon the processing conditions, with even larger grain sizes possible in some aspects of methods according to the present invention. In some aspects, each crystal of the material may comprise a single magnetic domain. Both doped Co$_2$Z and un-doped Co$_2$Z may be members of the planar hexaferrite family called ferroxplana, having a Z-type ferrite crystal structure.

In some methods catering to applications where a powdered doped hexaferrite material is desired, the sintered material may be crushed after sintering (step 80).

In the method described above, one or both of the heating steps 30 and 70 may be performed in air at atmospheric pressure (with an absolute partial pressure of oxygen of about three pounds per square inch) or in an atmosphere with an absolute oxygen partial pressure up to about twelve pounds per square inch above that in air at atmospheric pressure (i.e., about fifteen psi). One or both of the heating steps 30 and 70 may be performed in air at other air pressures and oxygen partial pressures according to other aspects of methods according to the present invention. In some methods according to one or more aspects of the invention, gas types under which one or both of these heating steps may be performed may include oxygen pressurized up to twenty psi absolute pressure, flowing oxygen, stagnant air, flowing air, and mixtures of nitrogen or argon and oxygen from 0.5 atomic % up to pure oxygen. The flow rateof air or oxygen may vary and depends on various factors including, but not limited to, desired amount of available equivalent oxygen. For example, the air or oxygen flow rate can be up to about 50 cfm. In aspects in which flowing air, oxygen, or other gas is utilized, the flow rate may be, for example, about 30 cfm.

The description of the method above is not meant to be limiting. In some methods according to one or more aspects of the present invention, some of the steps described above may be combined, performed in alternate order, or even eliminated. Further, additional steps not explicitly described may be included in one or more aspects of methods according to the present invention.

Materials produced by one or more aspects of the method described above may comprise a compound or compounds of the formula Ba$_{3-y}$M$_x$Co$_2$Fe$_{24}$O$_{41}$ where M is an alkali metal, x is between zero and about one, and y is less than or equal to x. In one or more other aspects of the method described above, multiple alkali metal dopants may be introduced into the material, resulting in a compound or compounds of, for example, the formula Ba$_{3-z}$K$_w$Na$_x$Rb$_y$Co$_2$Fe$_{24}$O$_{41}$ wherein the sum of w, x, and y is in a range from between zero and about one and z is less than about one. The value of the subscripts w, x, y, and z will vary with the amount of alkali metal or metals and/or alkali metal precursor or precursors utilized in the formation of the material. The amounts of the various alkali metals added to form the doped hexaferrite may be selected to tailor the magnetic and electrical properties of the material such as electrical permittivity and magnetic permeability, to suit a particular application.

In some aspects of methods according to the present invention, other forms of dopants, for example, mono- or multivalent metals such as, but not limited to one or more of Ni, Bi, Co, Mn, Sr, Cu or Zn may be included in addition to one or more alkali metal dopants in manners similar to those used to introduce the one or more alkali metal dopants discussed above. The addition of one or more mono- or multi-valent metal dopants to the doped hexaferrite may be useful in applications where it is desired to modify the magnetic permeability of the doped hexaferrite.

In further aspects, sintering aids and/or density modification aids, for example, SiO$_2$ and/or CaO, and/or magnetic loss tangent adjustment agents, for example, MgO may also be added to the compound during formation in a concentration of, for example, form about zero to about three molar percent. Other agents and/or impurities that may be present in the compound may include one or more of Mn$_2$O$_3$, Al$_2$O$_3$, NiO, ZnO, SrO, TiO$_2$, ZrO$_2$, SnO$_2$, Y$_2$O$_3$, Cr$_2$O$_3$, Nb$_2$O$_5$, or CuO at a concentration of, for example, from about zero to about three molar percent.

In further aspects of methods according to the present invention, a doped hexaferrtie may be combined with one or more ferromagnetic materials, for example Co, Fe, or Ni, one or more ferroelectric materials, for example, BaTiO$_3$ or PbTiO$_3$, and/or one or more dielectric materials, for example, SiO$_2$, or any of various metal oxides or combinations thereof to form a composite material. Properties of the composite material, such as for example, magnetic permeability and/or electric permittivity may be tailored for a particular application by combining different amounts doped hexaferrite with different amounts of ferromagnetic, ferroelectric, and/or dielectric materials.

The doping level of a completed component formed from the doped hexaferrite may be uniform throughout the component. However, in some aspects according to the present invention, the doping level of a completed component formed from the doped hexaferrite may be non-uniform throughout the component. For example, the doping level of one or more dopants may be higher or lower in regions proximate to or at a surface of the component as opposed to regions interior to the component. This may be accomplished in a number of ways.

In one method according to one or more aspects of the present invention, a doping concentration gradient may be created by varying the amount of precursor doping compounds added relative to the hexaferrite in different regions of the pre-sintered doped hexaferrite material. In other methods according to one or more aspects of the present invention, a compound comprising a higher level of a particular dopant than present in the doped hexaferrite may be placed in contact with an area or areas of the doped hexaferrite during at least a portion of the calcining and/or sintering steps, allowing dopant to diffuse into the doped hexaferrite from the surface inward resulting in a gradient of this dopant from a higher level at the surface to a lower level at the interior of the doped hexaferrite component. The doping profile of the doping gradient may be modified by heat treatment methods to create, for example, linear or exponential dopant gradients. Alternatively, a material compound comprising a lower level of a particular dopant than present in the doped hexaferrite may be placed in contact with an area or areas of the doped hexaferrite during at least a portion of the calcining and/or sintering steps, allowing the dopant to diffuse outward from the surface of the doped hexaferrite, resulting in a gradient of the dopant concentration from a higher level at the interior to a lower level at the surface of the formed doped hexaferrite component.

The gradient of the doping level of multiple different dopants may be controlled in this manner, e.g., different compounds with different levels of different dopants may be placed in contact with the doped hexaferrite at different times or for different time periods or at different temperatures during various phases of calcining and/or sintering steps of formation of the doped hexaferrite compound.

Dopant gradients may also be introduced into the doped hexaferrite using techniques such as those that involve ion implantation and subsequent heat treatment. According to an even further aspect of a method according to the present invention, doped hexaferrite may be exposed at a high temperature, such as during a sintering step, to an atmosphere rich in a dopant or dopant compound in order to introduce the dopant into the doped hexaferrite.

Gradients in doping level in the doped hexaferrite may be useful in some applications where properties such as conductivity are desired to be at a particular level, e.g. low, at the surface of a doped hexaferrite, but higher within the bulk of the material. A particular dopant may affect multiple properties such as conductivity and magnetic permeability. If conductivity is enhanced, while magnetic permeability is degraded by increased levels of a particular dopant, in some applications it might be desirable to produce a doped hexaferrite component with a high level of this dopant in the interior of the component, but a low level on the exterior, to provide a component with a high overall magnetic permeability but low surface conductivity.

In some aspects according to the present invention, the doped hexaferrite may be machined before or after sintering into the shape and size of a desired component.

In other aspects, the doped hexaferrite, in powdered or non-powdered form, may be incorporated into a polymer or other material, such as, for example, an epoxy to form a composite material in a desired shape. The polymer or epoxy may function as a binder for the doped hexaferrite material. The doped hexaferrite may be crushed into a powder and mixed with a molten polymer or liquid epoxy which is allowed to cure. In some applications, the polymer or epoxy may be cured in a mold in the shape of a desired component. This may be useful in applications where the shape of a desired component is difficult to achieve by machining, or in applications where it is desired to impart a degree of flexibility or resistance to cracking to a component including the doped hexaferrite. Polymers or epoxies with appropriate levels of flexibility and/or hardness may be selected and various loadings of doped hexaferrite material may be incorporated into the polymer or epoxy matrix to produce a component with a desired flexibility and/or impact resistance and desired magnetic and electrical properties. In some aspects, additional materials such as ferroelectric or dielectric materials may be combined with the doped hexaferite in the epoxy or polymer matrix to form a composite material with desired magnetic and/or electrical properties.

In other aspects, the doped hexaferrite may be joined with a dielectric material to form a composite magnetic/dielectric device component. For example, a rod formed of the doped hexaferrite might be joined with an adhesive within a tube of a dielectric, such as, for example, a ceramic material having the composition $MgO$—$CaO$—$ZnO$—$Al_2O_3$—$TiO_2$. The rod and tube assembly could then be cut into disks, comprising a disk of the doped hexaferrite surrounded coaxially by a ring of dielectric. Such disks might be used as components of high frequency circulators or isolators.

In other aspects, doped hexaferrites according to aspects of the present invention may be deposited onto a semiconductor by sputtering or other means, as part of, for example, fabrication of a radio frequency integrated circuit, to form a multi-layer chip inductor or a multi-layer chip bead.

The materials and material combinations discussed above may exhibit superior magnetic properties at high frequencies versus materials such as un-doped $Co_2Z$ as is illustrated in FIGS. 2-14 below.

EXAMPLE

Sample Preparation

Appropriate levels of $BaCO_3$, $Co_3O_4$, and $Fe_2O_3$ precursors were mixed along with various amounts of alkali metal carbonates (0.06 wt. %, 0.12 wt. %, 0.6 wt. %, 1.2 wt. %, and 3.6 wt. % potassium carbonate; 0.04 wt. %, 0.08 wt. %, and 0.4 wt. % sodium carbonate; and 0.02 wt. %, 0.04 wt. %, 0.1 wt %, 0.2 wt. %, 0.4 wt. %, and 0.8 wt. % rubidium carbonate) to form samples of doped $Co_2Z$. Two seven millimeter outside diameter toroids of each material sample were formed, a short one (~100 mils (0.254 cm) in length) and a long one (~200 mils (0.508 cm) in length).

The samples were formed by first blending the $BaCO_3$, $Co_3O_4$, and $Fe_2O_3$ precursors in a ball mill in water, drying the blended combination, and calcining the blended combination under stagnant air at atmospheric pressure at a soak temperature of 1190° C. for eight hours in a kiln, with a heating rate and a cooling rate of 100° C./hour Alkali metal carbonates at the concentrations listed above were added to the calcined material used to form each individual sample. The calcined material and alkali metal carbonate for each sample was then milled in a ball mill in water to form particles with a median diameter of about fifty micrometers. The milled material was dried and pressed into 0.5 inch (1.3 cm) diameter, two inch (5.1 cm) long rods using an isostatic press under a pressure of about 180,000 N/m². The rods were then cut into the shape and dimensions described above and sintered under oxygen at atmospheric pressure flowing at 30 cfm at a soak temperature of 1250° C. for eight hours in a kiln with a heating and cooling rate of 100° C./hour.

Figure 15:
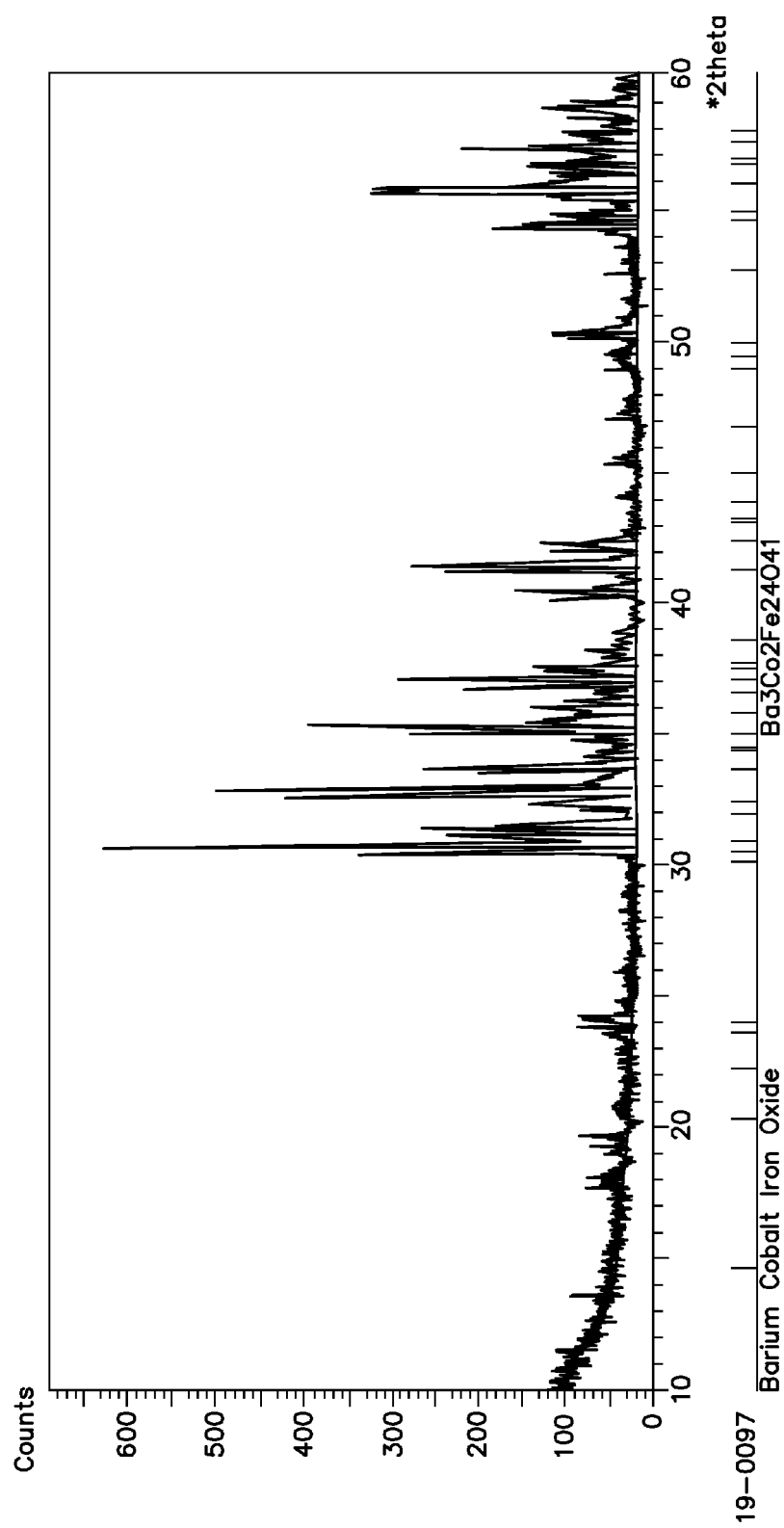
FIG. 15 is a copy of an X-Ray diffraction pattern test performed on a Philips diffractometer model number PW 1830 operating at 45 kilovolts and 35 milliamps, scanning at a 2 theta angle from between 10 and 60 degrees of a $Co_2Z$ compound doped with 0.3 wt. % $K_2O$ produced according to an aspect of a method according to the present invention.

The above process produces $Co_2Z$ doped with or alkali metal oxides in accordance with some aspects of the present invention. As shown in FIG. 15, a compound produced according to the method above and doped with 0.3 wt. % $K_2O$ exhibits X-ray diffraction peaks at locations corresponding to those that would be expected from $Co_2Z$, the angular positions of which are indicated by the short vertical lines on the horizontal line labeled "Barium Cobalt Iron Oxide" in FIG. 15.

Analysis Methodology

The data in FIGS. 2-14 was generated using the following procedure:

The samples were analyzed in a coaxial airline and the full S-parameter scattering matrix from 50 MHz to 18,500 MHz (18.5 GHz) was recorded. From this data, the material characteristics $\in^*$ (the dimensionless complex relative electrical permittivity) and $\mu^*$ (the dimensionless complex relative magnetic permeability) were extracted using the methods described in A. M. Nicolson and G. F. Ross, in "Measurement of the intrinsic properties of materials by time domain techniques," IEEE Transactions on Instrumentation and Measurement, vol. 19, no. 4, pp 377-382, November 1970, as modified in the paper by James Baker-Jarvis, Eric J. Vanzura, and William A. Kissick, "Improved Technique for Determining Complex Permittivity with the Transmission/Reflection Method," IEEE Transactions on Microwave Theory and Techniques, vol. 38, no. 8, pp 1096-1103, August 1990, incorporated herein by reference. The shorter samples tended to yield noisy data at the low end of this frequency range, but provided consistent results at higher frequencies. The longer samples exhibited the opposite behavior; they tended to yield consistent data at the low frequency range but yielded noisy data at higher frequencies. Both sets of data overlapped across a fairly broad section within the frequency range at which testing was performed. After these measurements were collected, the smaller samples were analyzed using a Hewlett-Packard 4291 Impedance Analyzer at frequencies from 1 MHz to 1800 MHz (1.8 GHz). Three sets of data were thus generated for each sample tested, which overlapped to a large extent. This data was plotted together, and the points which were not consistent from set to set were discarded, resulting in smooth curves from 1 MHz to 18.5 GHz. Some discontinuities in the curves generated were observed as artifacts of this measurement methodology.

Effect of Potassium Carbonate Doping on Real Component of Magnetic Permeability

Figure 2A:
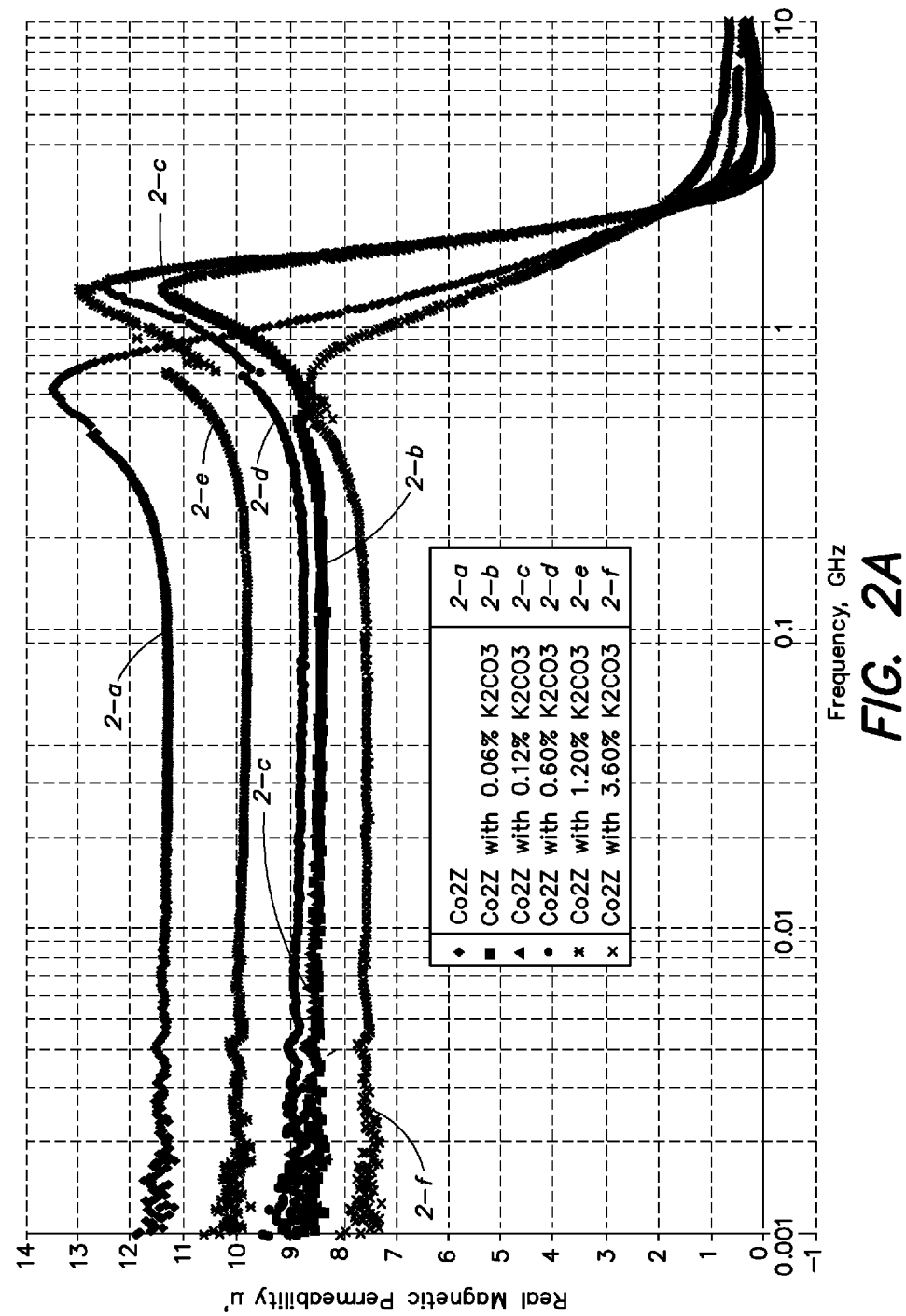
FIG. 2a is a graph showing the real component of relative magnetic permeability as a function of frequency for various potassium doped hexaferrites according to one or more aspects of the present invention.
Figure 2B:
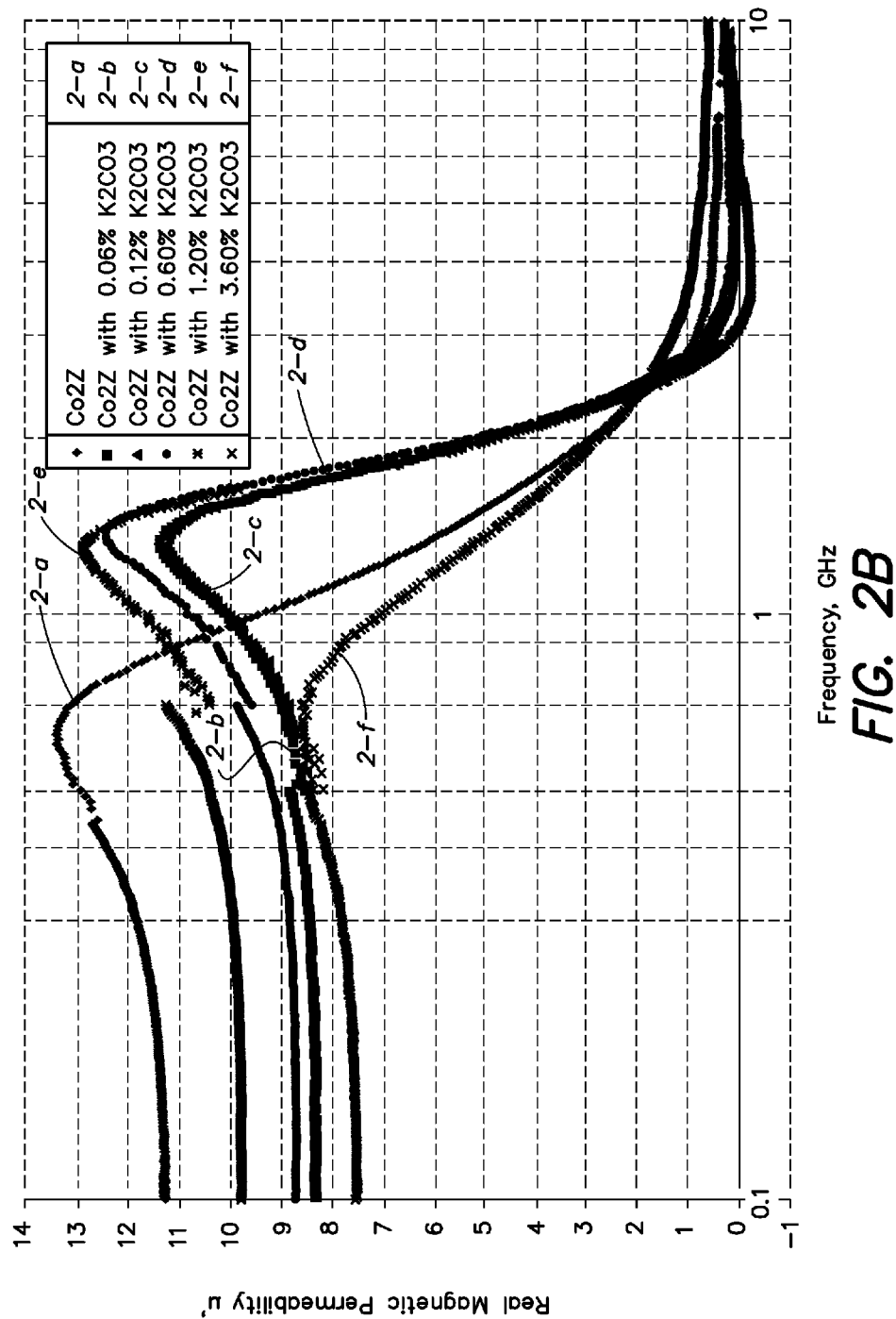
FIG. 2b is the graph of FIG. 2a, with the frequency axis re-scaled to more clearly illustrate the data at frequencies from 100 MHz to 10 GHz.

Referring to FIGS. 2a and 2b, there is shown the change in the real component of the dimensionless complex relative magnetic permeability $\mu$ (referred to herein simply as the magnetic permeability) versus frequency for $Co_2Z$ doped with various levels of potassium carbonate. In these figures, the data sets obtained from the analysis of $Co_2Z$ doped with 0 wt. %, 0.06 wt. %, 0.12 wt. %, 0.6 wt. %, 1.2 wt. %, and 3.6 wt. % potassium carbonate are designated by lines 2-*a* through 2-*f*, respectively. It can be seen that potassium carbonate doped $Co_2Z$ demonstrates a relatively constant magnetic permeability below about 0.2 GHz. At higher frequencies, the material demonstrates a rise in magnetic permeability followed by a peak and then a rapid drop off in magnetic permeability as the frequency increases further. The point at which the magnetic permeability of a material reaches a peak will be referred to herein as the "resonant frequency" of the material. In FIGS. 2a and 2b it can be observed that the addition of small amounts (e.g., less than about 3.6 wt. %) of potassium carbonate to $Co_2Z$ increases the resonant frequency of the material. For example, un-doped $Co_2Z$ exhibits a resonant frequency at about 0.64 GHz, while $Co_2Z$ formed from $BaCO_3$, $Co_2O_3$, and $Fe_2O_3$ precursors and doped with about 0.6 wt. % $K_2CO_3$ precursor exhibits a resonant frequency at about 1.4 GHz, more than about twice that of un-doped $Co_2Z$. This shows that electric device components, such as, for example, high frequency inductor cores, made from potassium doped $Co_2Z$ may be capable of retaining their magnetic permeability and operating in a frequency range higher than, or in a broader frequency range than that of similar devices or device components made from un-doped $Co_2Z$.

It can also be observed that the addition of potassium carbonate precursor to the $Co_2Z$ material results in a decrease in the low frequency (e.g. frequencies below the resonant frequency of the material) absolute level of magnetic permeability. This shows that the increase in resonant frequency may correlate to a decrease in absolute magnetic permeability.

For high levels of potassium doping (e.g., 3.6 wt. % $K_2CO_3$ precursor) the increase in the resonant frequency of the material is not as pronounced as it is for $Co_2Z$ with lower levels of potassium doping. At a high potassium doping level (e.g., 3.6 wt. % $K_2CO_3$ precursor), the resonant frequency of the doped material approaches that of un-doped $Co_2Z$.

Figure 3A:
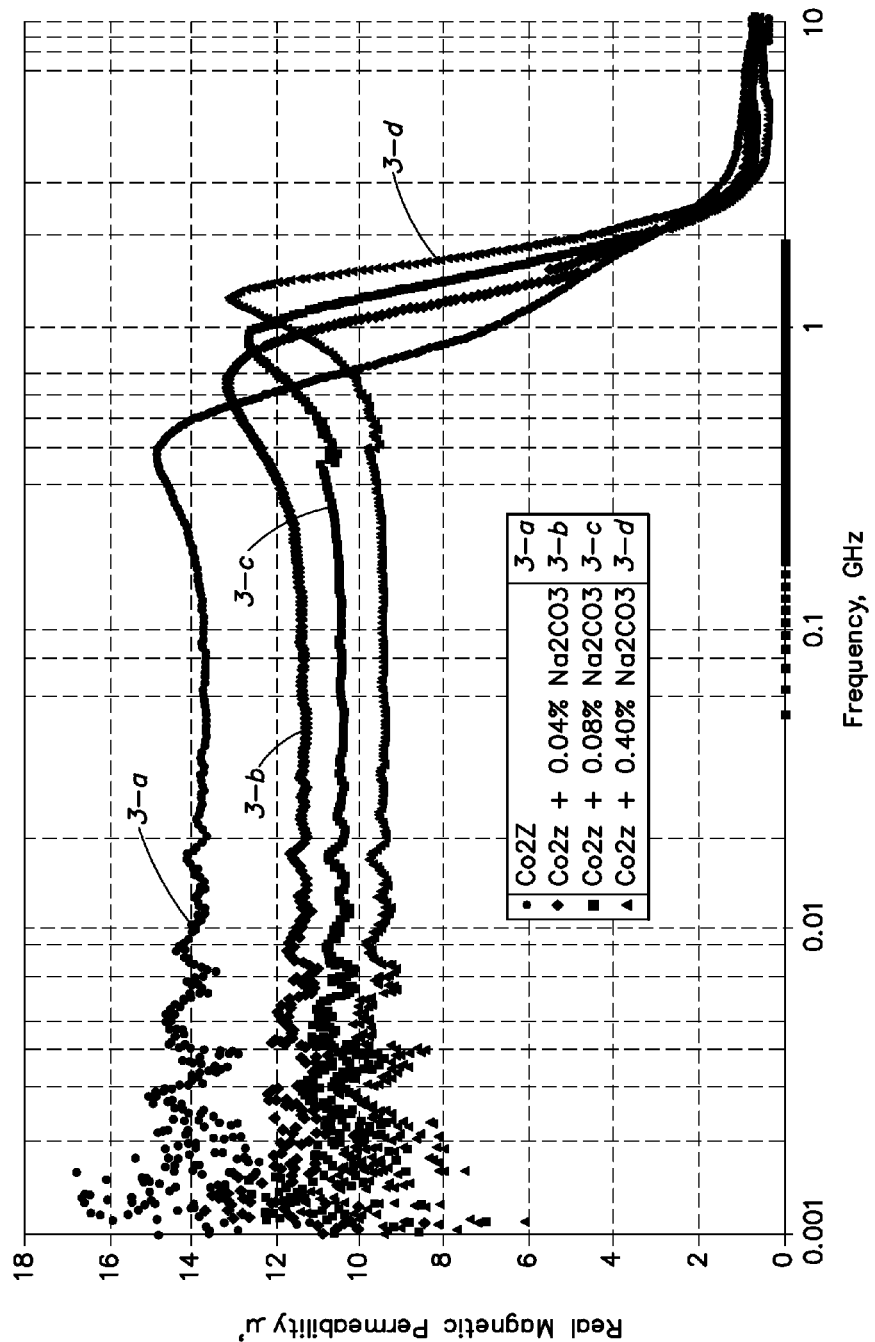
FIG. 3a is a graph showing the real component of relative magnetic permeability as a function of frequency for various sodium doped hexaferrites according to one or more aspects of the present invention.
Figure 3B:
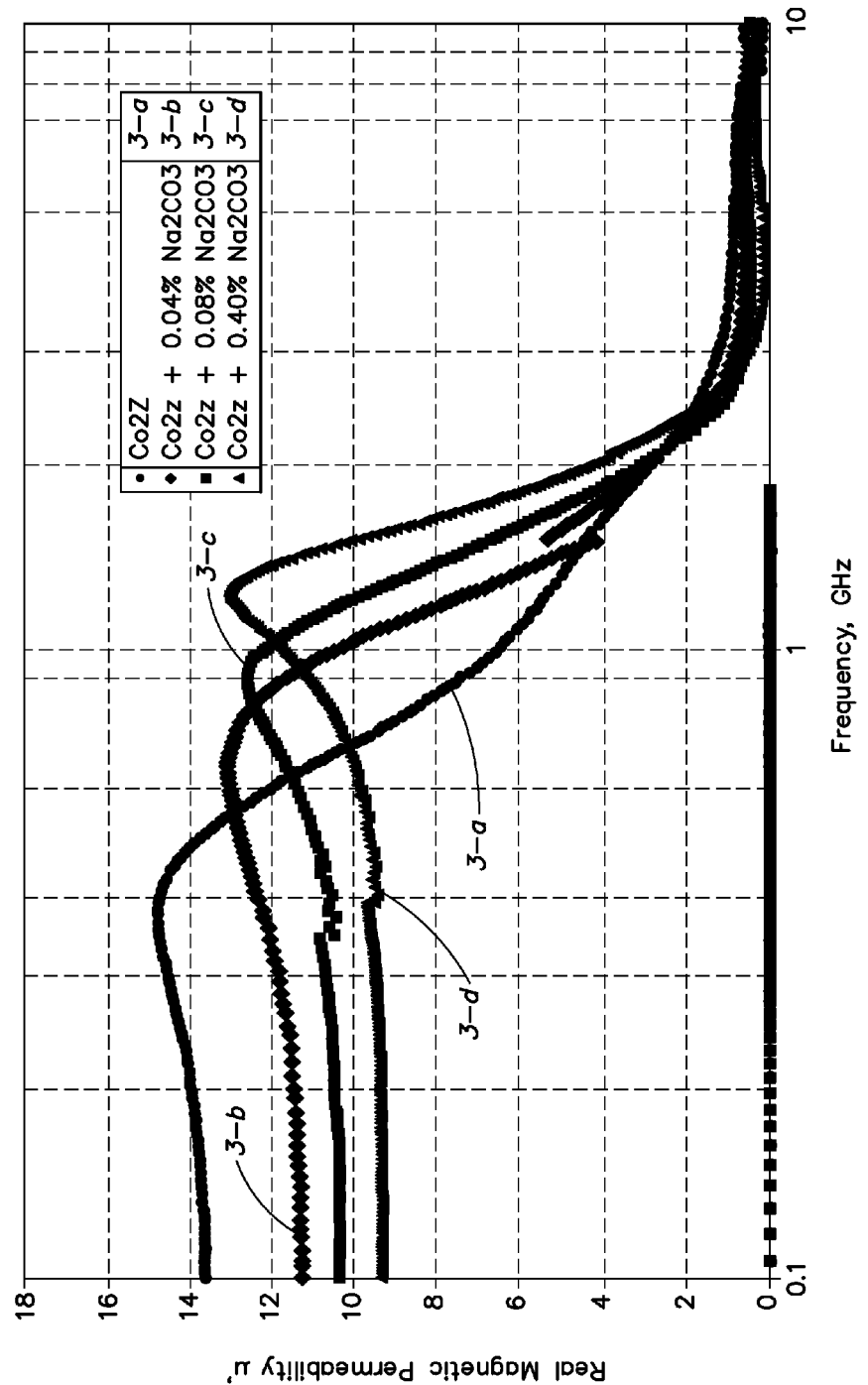
FIG. 3b is the graph of FIG. 3a, with the frequency axis re-scaled to more clearly illustrate the data at frequencies from 100 MHz to 10 GHz.
Figure 4A:
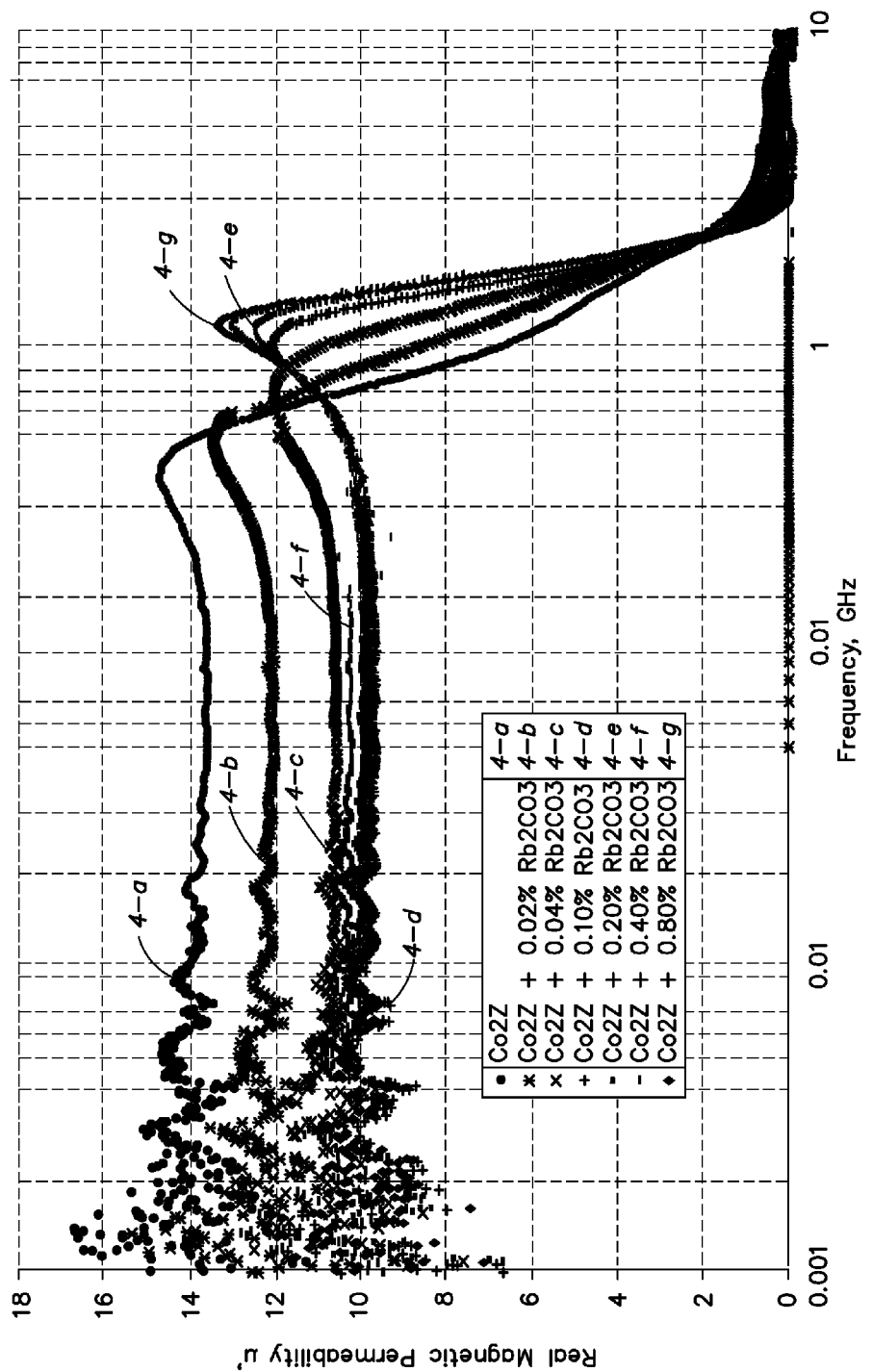
FIG. 4a is a graph showing the real component of relative magnetic permeability as a function of frequency for various rubidium doped hexaferrites according to one or more aspects of the present invention.
Figure 4B:
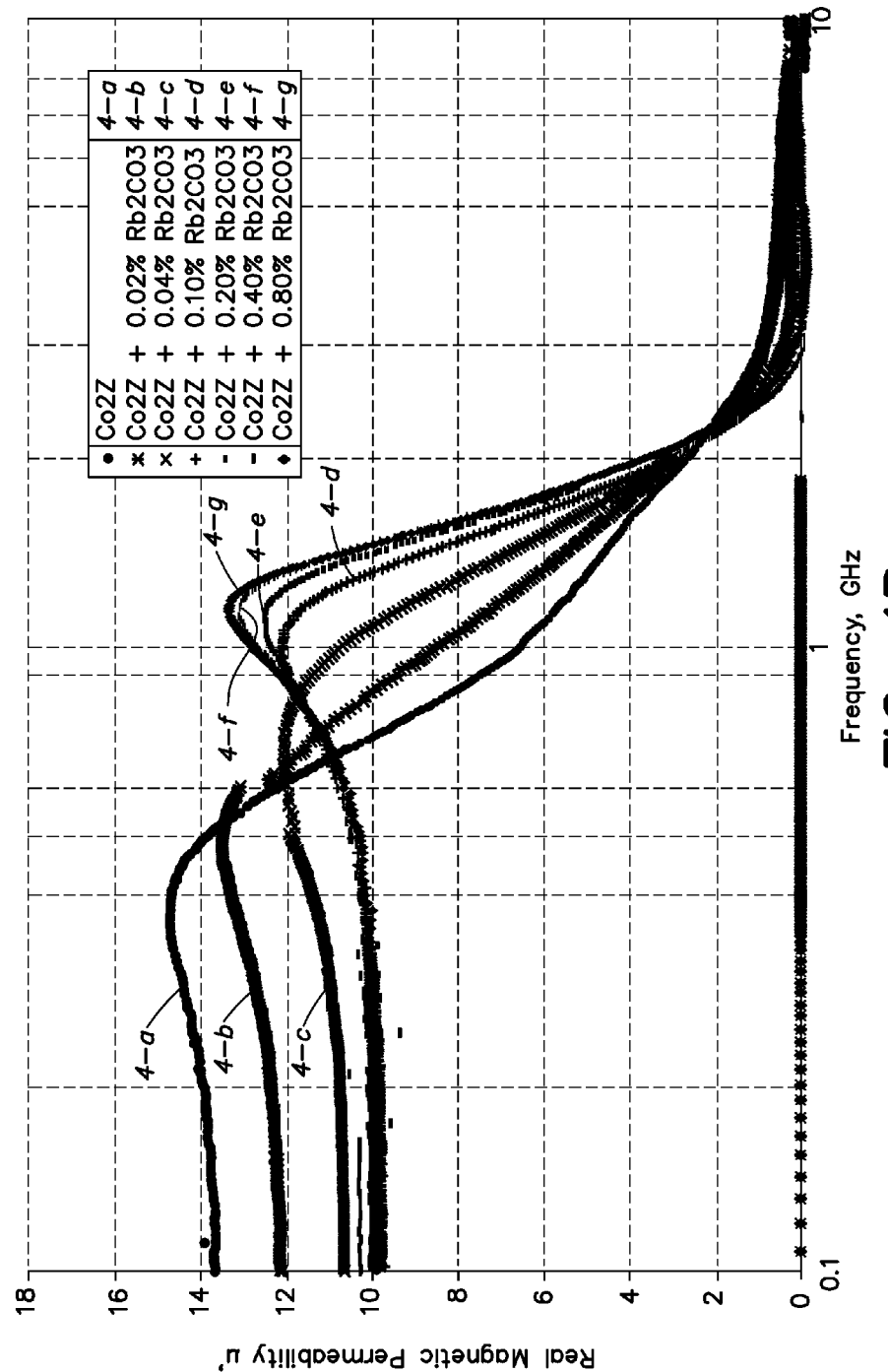
FIG. 4b is the graph of FIG. 4a, with the frequency axis re-scaled to more clearly illustrate the data at frequencies from 100 MHz to 10 GHz.

Effect of Sodium Carbonate and Rubidium Carbonate Doping on Real Component of Magnetic Permeability FIGS. 3*a*, 3*b*, 4*a*, and 4*b* illustrate the change in magnetic permeability versus frequency of $Co_2Z$ doped with various levels of sodium carbonate and rubidium carbonate, respectively. In these figures, the data sets obtained from the analysis of $Co_2Z$ doped with 0 wt. %, 0.04 wt. %, 0.08 wt. %, and 0.4 wt. % sodium carbonate, in FIGS. 3*a* and 3*b*, are designated by lines 3-*a* through 3-*d*, respectively, and the data sets obtained from the analysis of $Co_2Z$ doped with 0 wt. %, 0.02 wt. %, 0.04 wt. %, 0.1 wt %, 0.2 wt. %, 0.4 wt. %, and 0.8 wt. % rubidium carbonate, in FIGS. 4*a*-4-*b*, are designated by lines 4-*a* through 4-*g*, respectively.

The un-doped $Co_2Z$ analyzed in conjunction with the sodium carbonate and rubidium carbonate doped $Co_2Z$ had a different fired density than that analyzed in conjunction with the potassium carbonate doped $Co_2Z$, which resulted in different observed magnetic properties for the un-doped $Co_2Z$ illustrated in FIGS. 3*a*, 3*b*, 4*a*, and 4*b* versus the observed magnetic properties of the un-doped $Co_2Z$ illustrated in FIGS. 2*a* and 2*b*. This explains the discrepancy in, for example, the observed resonant frequency for the un-doped $Co_2Z$ tested along with the potassium carbonate doped materials verses that of the un-doped $Co_2Z$ tested along with the sodium carbonate and rubidium carbonate doped materials.

Like in FIGS. 2*a* and 2*b* for potassium carbonate, it can be observed in FIGS. 3*a*, 3*b*, 4*a*, and 4*b* that the addition of sufficient amounts of sodium carbonate or rubidium carbonate to $Co_2Z$ increases the resonant frequency of the material relative to un-doped $Co_2Z$ while decreasing the absolute level of magnetic permeability at low frequencies. For example, $Co_2Z$ doped with about 0.4 wt. % $Na_2CO_3$ precursor exhibits a resonant frequency of about 1.3 GHz and a low frequency magnetic permeability of about 9.5 versus a resonant frequency of about 0.4 GHz and a low frequency magnetic permeability of about 14 for un-doped $Co_2Z$. $Co_2Z$ doped with about 0.8 wt. % $Rb_2CO_3$ precursor exhibits a resonant frequency of about 1.15 GHz and a low frequency magnetic permeability of about 10 versus a resonant frequency of about 0.4 GHz and a low frequency magnetic permeability of about 14 for un-doped $Co_2Z$.

Comparison of Resonant Frequency for Different Alkali Metal Dopants

Figure 5:
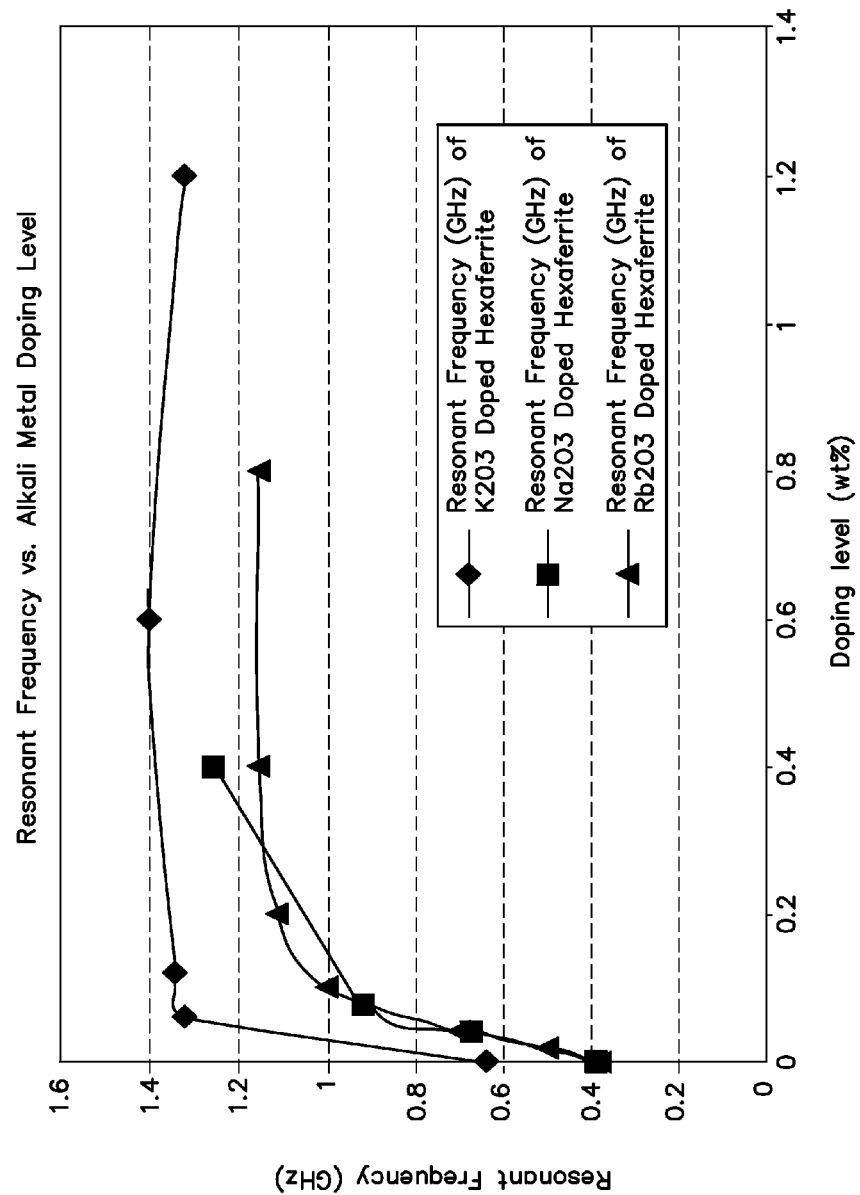
FIG. 5 is a graph showing the resonant frequency of potassium, sodium, and rubidium doped hexaferrites as a function of doping level.

FIG. 5 illustrates the magnetic permeability resonant frequency versus doping level for potassium carbonate, sodium carbonate, and rubidium carbonate doped $Co_2Z$. A data point corresponding to 3.6 wt. % potassium carbonate doped $Co_2Z$ was omitted from this chart for clarity. It can be observed that there is a rapid rise in resonant frequency below about 0.2 wt. % dopant precursor added, with the change in resonant frequency per unit of additional dopant added decreasing as the total amount of dopant added increases. This shows that there may be a particular upper level of alkali metal dopant that may be added to increase the resonant frequency of $Co_2Z$-based material, above which there is little additional affect on the material's resonant frequency.

Effect of Alkali Metal Doping on Imaginary Component of Magnetic Permeability

Figure 6A:
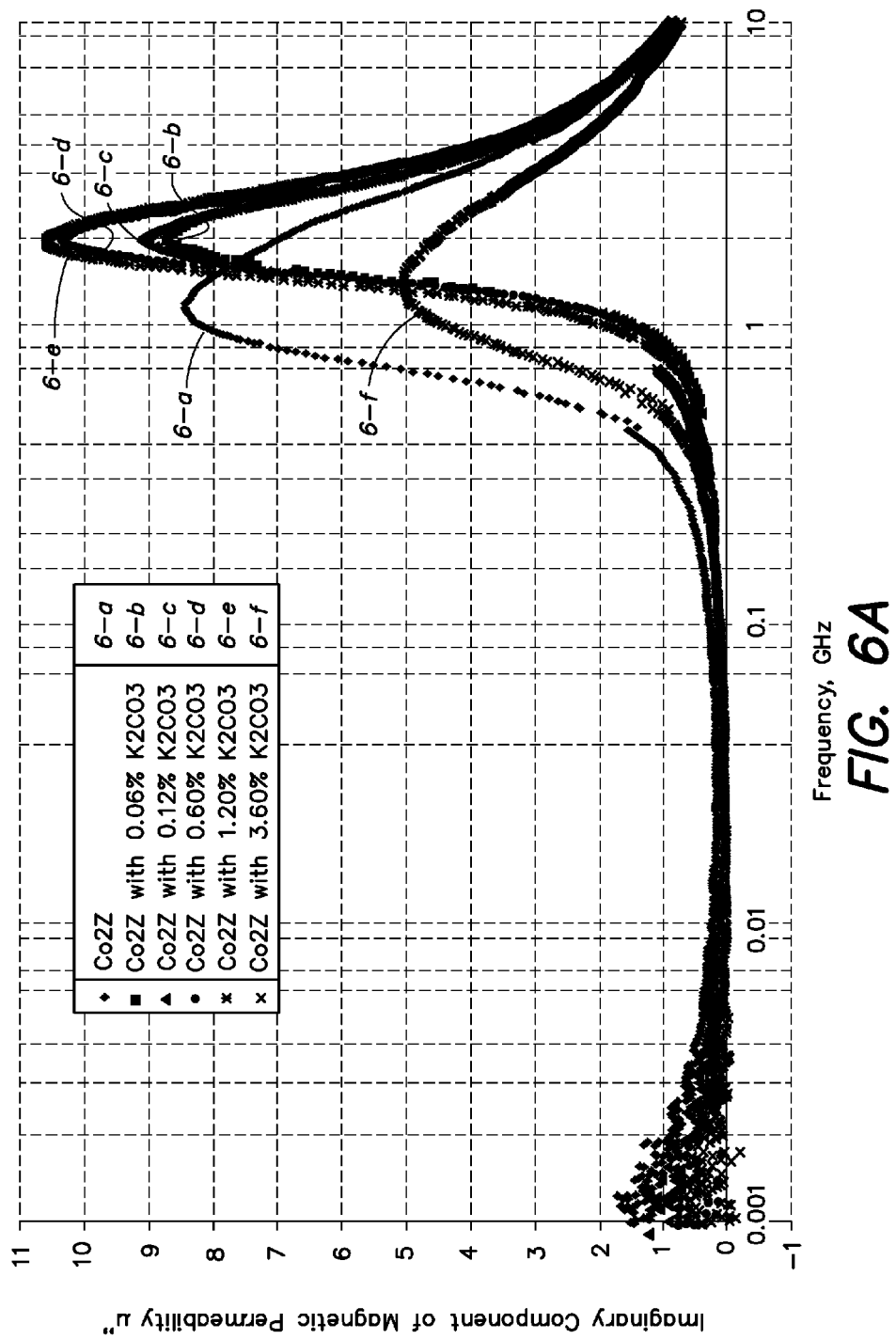
FIG. 6a is a graph showing the imaginary component of relative magnetic permeability as a function of frequency for potassium doped hexaferrites at several doping levels according to one or more aspects of the present invention.
Figure 6B:
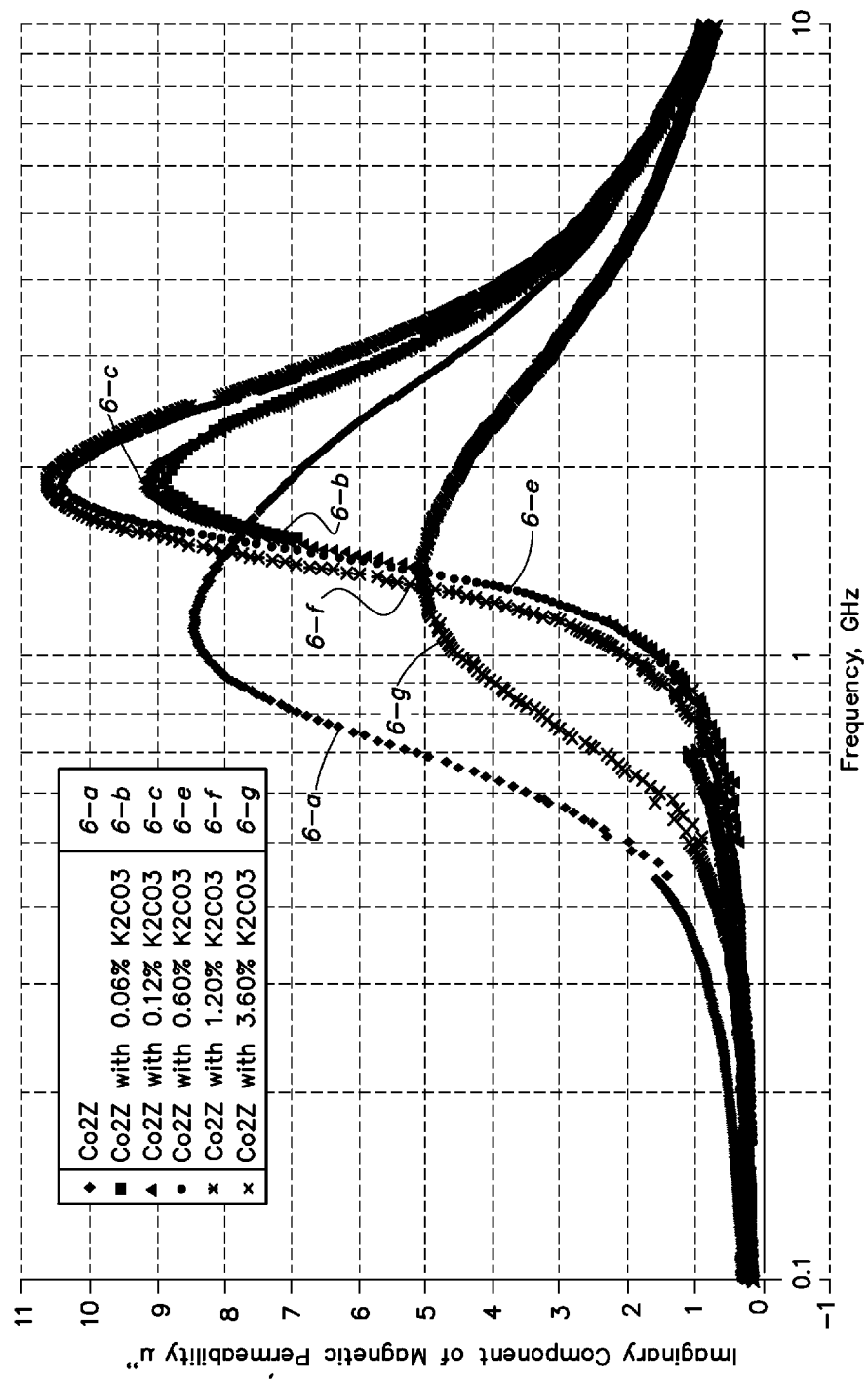
FIG. 6b is the graph of FIG. 6a, with the frequency axis re-scaled to more clearly illustrate the data at frequencies from 100 MHz to 10 GHz.
Figure 7A:
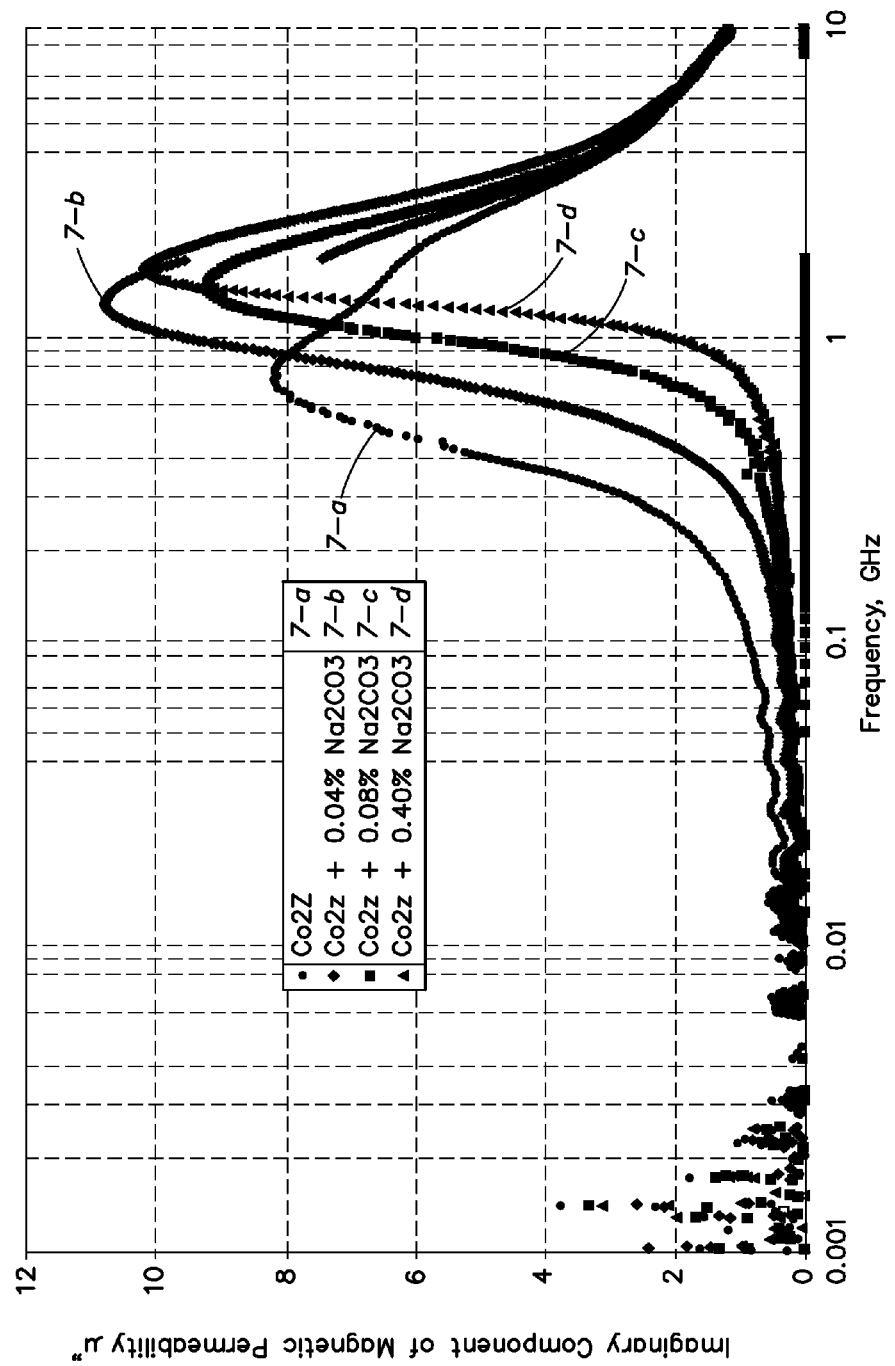
FIG. 7a is a graph showing the imaginary component of relative magnetic permeability as a function of frequency for sodium doped hexaferrites at several doping levels according to one or more aspects of the present invention.
Figure 7B:
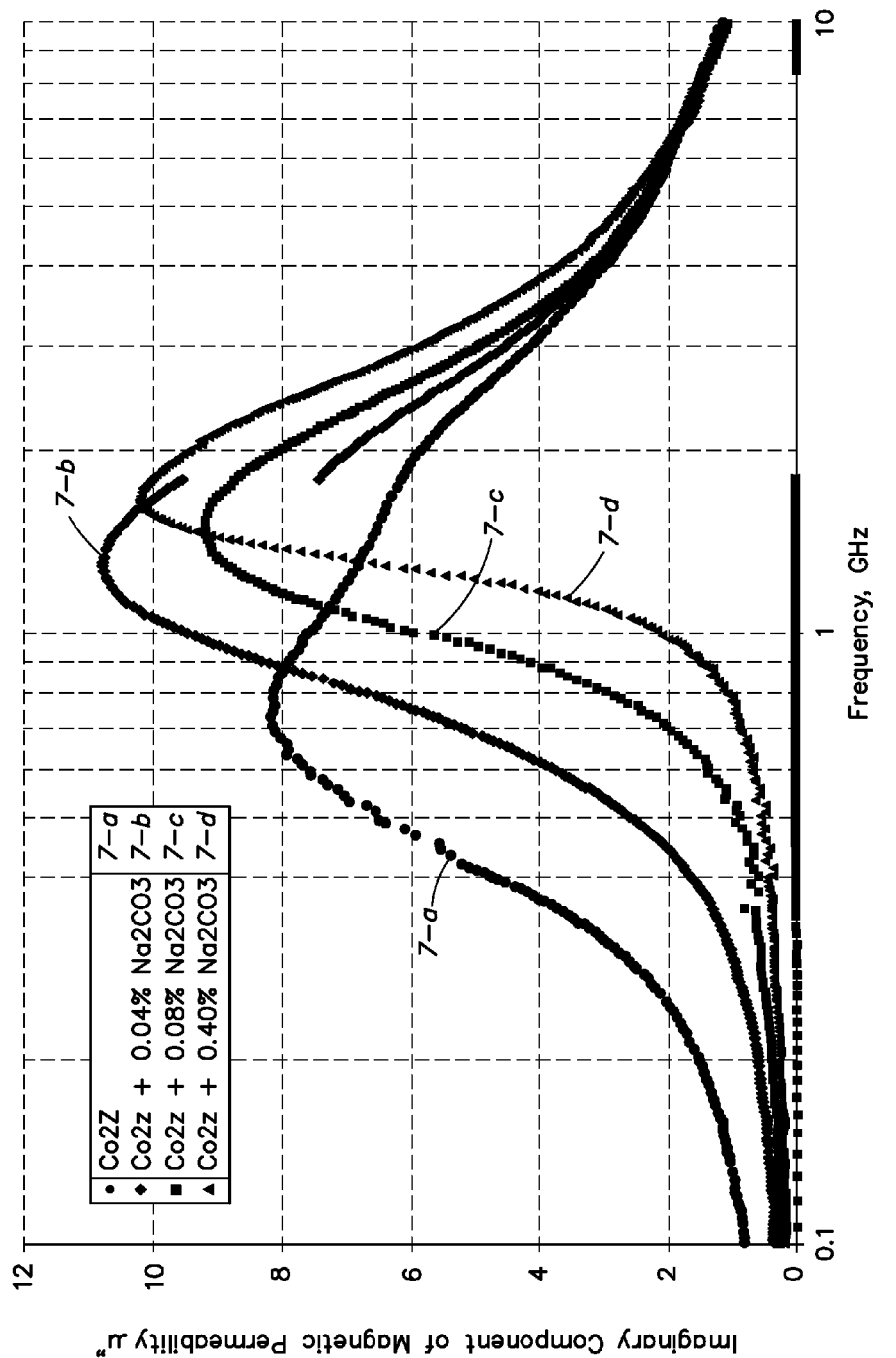
FIG. 7b is the graph of FIG. 7a, with the frequency axis re-scaled to more clearly illustrate the data at frequencies from 100 MHz to 10 GHz.
Figure 8A:
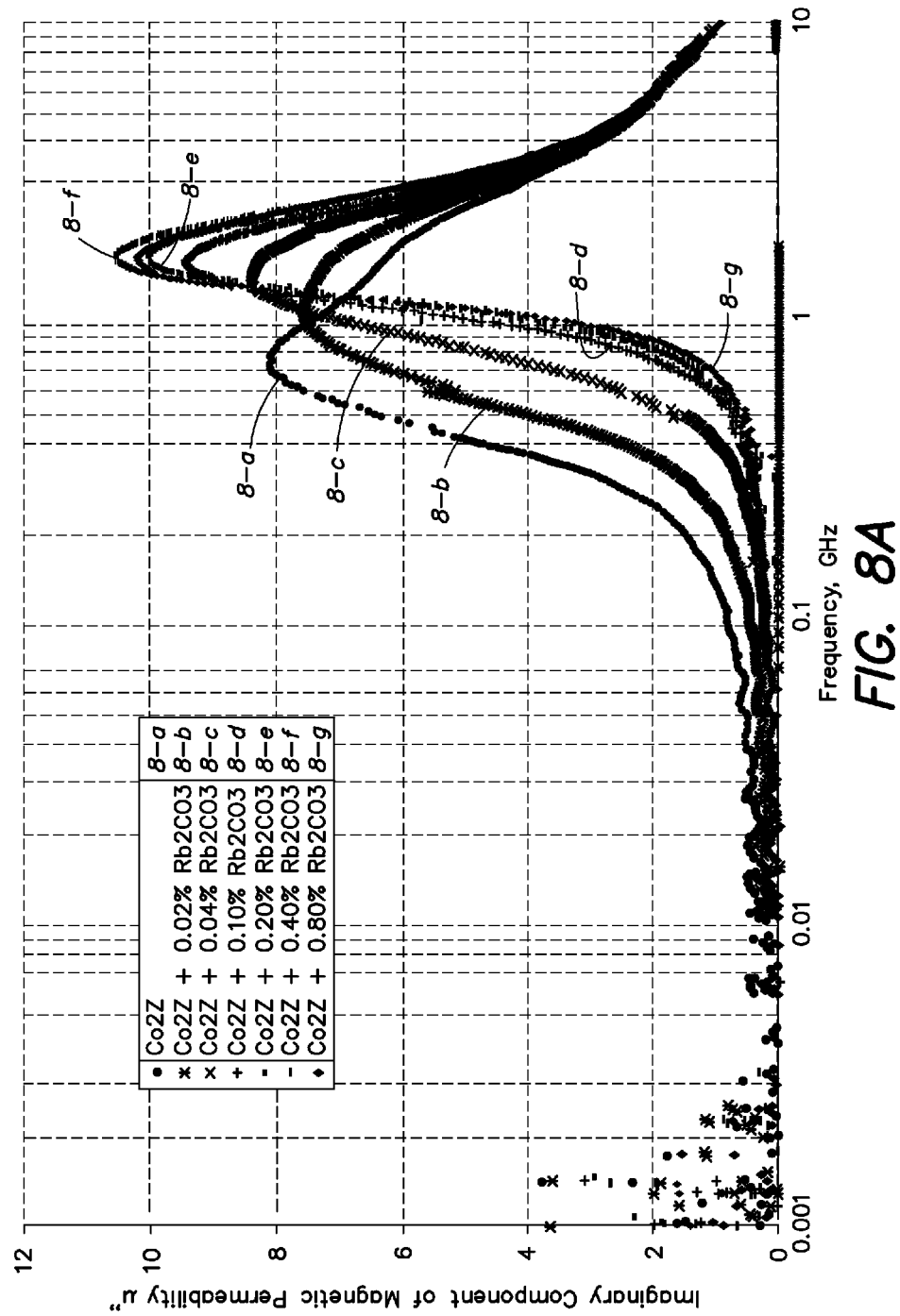
FIG. 8a is a graph showing the imaginary component of relative magnetic permeability as a function of frequency for rubidium doped hexaferrites at several doping levels according to one or more aspects of the present invention.
Figure 8B:
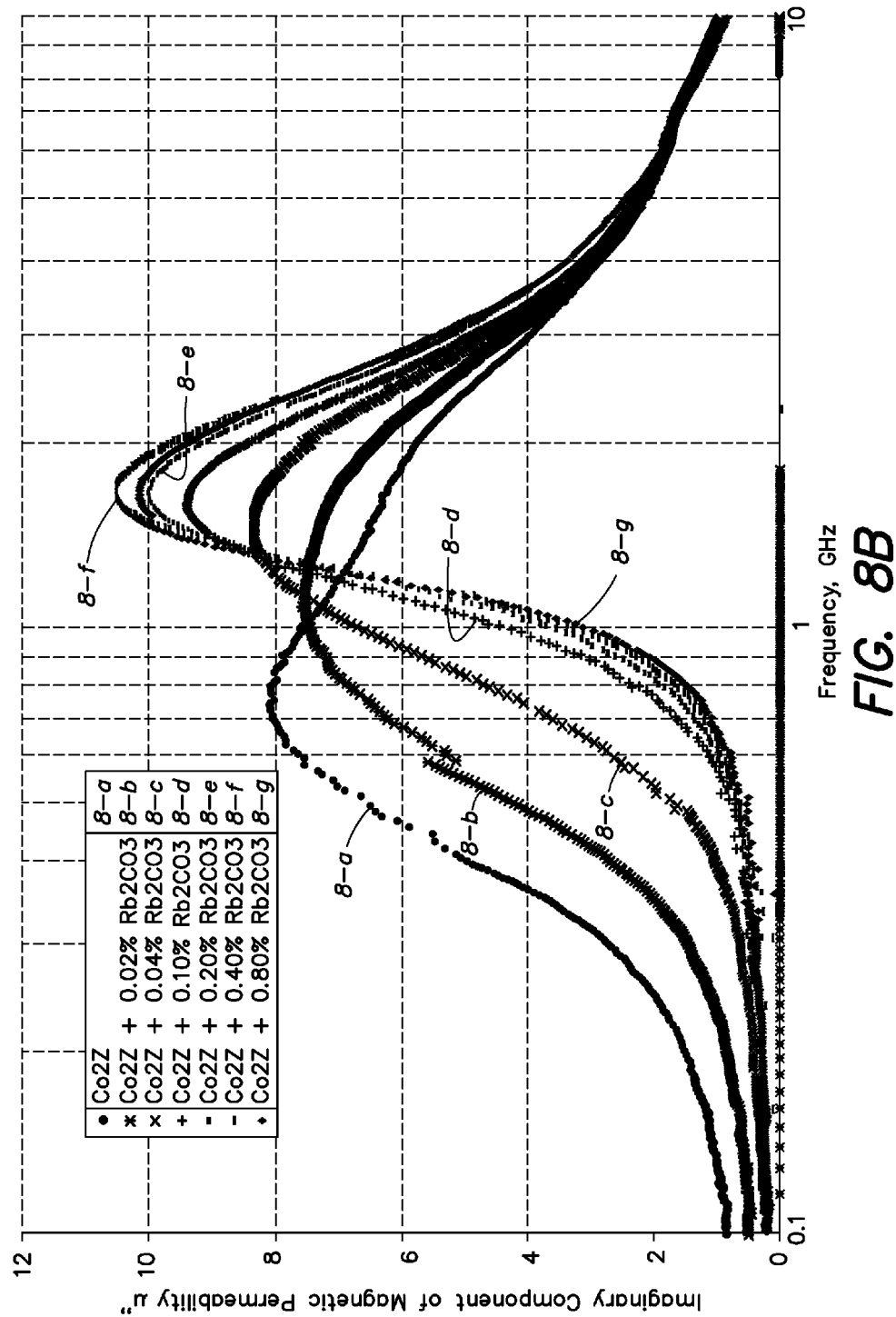
FIG. 8b is the graph of FIG. 8a, with the frequency axis re-scaled to more clearly illustrate the data at frequencies from 100 MHz to 10 GHz.

FIGS. 6a-8b illustrate the response of $\mu''$, the imaginary component of the complex relative magnetic permeability, which corresponds to energy loss in the material at high frequencies, for doped and un-doped $Co_2Z$. In these figures, the data sets obtained from the analysis of $Co_2Z$ doped with 0 wt. %, 0.06 wt. %, 0.12 wt. %, 0.6 wt. %, 1.2 wt. %, and 3.6 wt. % potassium carbonate, in FIGS. 6a-6b, are designated by lines 6-a through 6-f, respectively, the data sets obtained from the analysis of $Co_2Z$ doped with 0 wt. %, 0.04 wt. %, 0.08 wt. %, and 0.4 wt. % sodium carbonate, in FIGS. 7a-7b, are designated by lines 7-a through 7-d, respectively, and the data sets obtained from the analysis of $Co_2Z$ doped with 0 wt. %, 0.02 wt. %, 0.04 wt. %, 0.1 wt %, 0.2 wt. %, 0.4 wt. %, and 0.8 wt. % rubidium carbonate, in FIGS. 8a-8b, are designated by lines 8-a through 8-d, respectively.

It can be observed that for all of the alkali metal doped materials, both the initial rise and the peak in $\mu''$ occur at higher frequencies than for un-doped $Co_2Z$. It can also be observed that $\mu''$ peaks at higher frequencies than $\mu'$ for all the materials, including the un-doped $Co_2Z$. This shows that these materials do not exhibit high levels of energy loss below their resonant frequencies, and thus may be useful for applications in high frequency devices at frequencies approaching their resonant frequencies.

Effect of Alkali Metal Doping on Magnetic Loss Tangent

Figure 9:
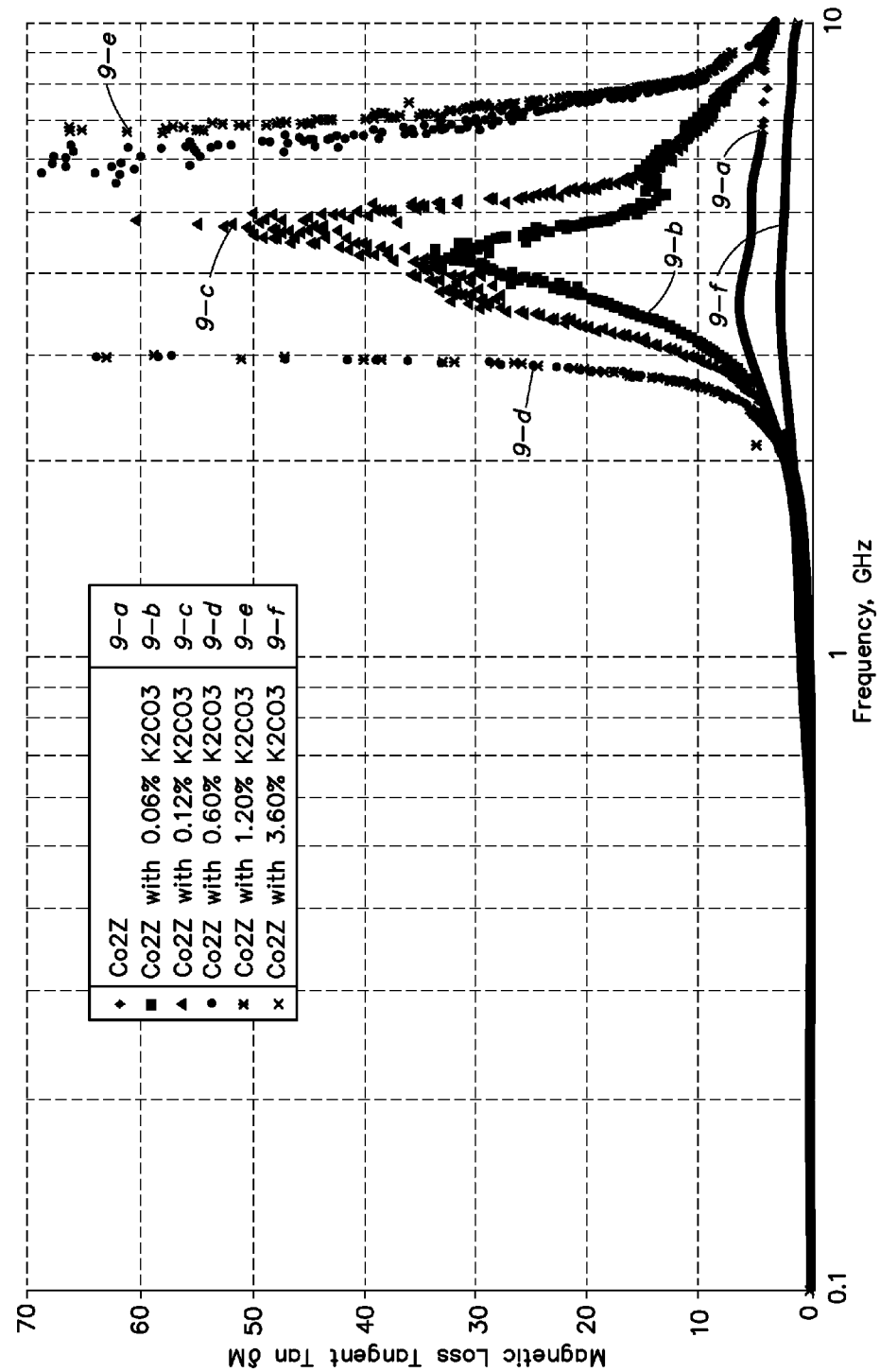
FIG. 9 is a graph showing the magnetic loss tangent as a function of frequency for potassium doped hexaferrites at several doping levels according to one or more aspects of the present invention.
Figure 10:
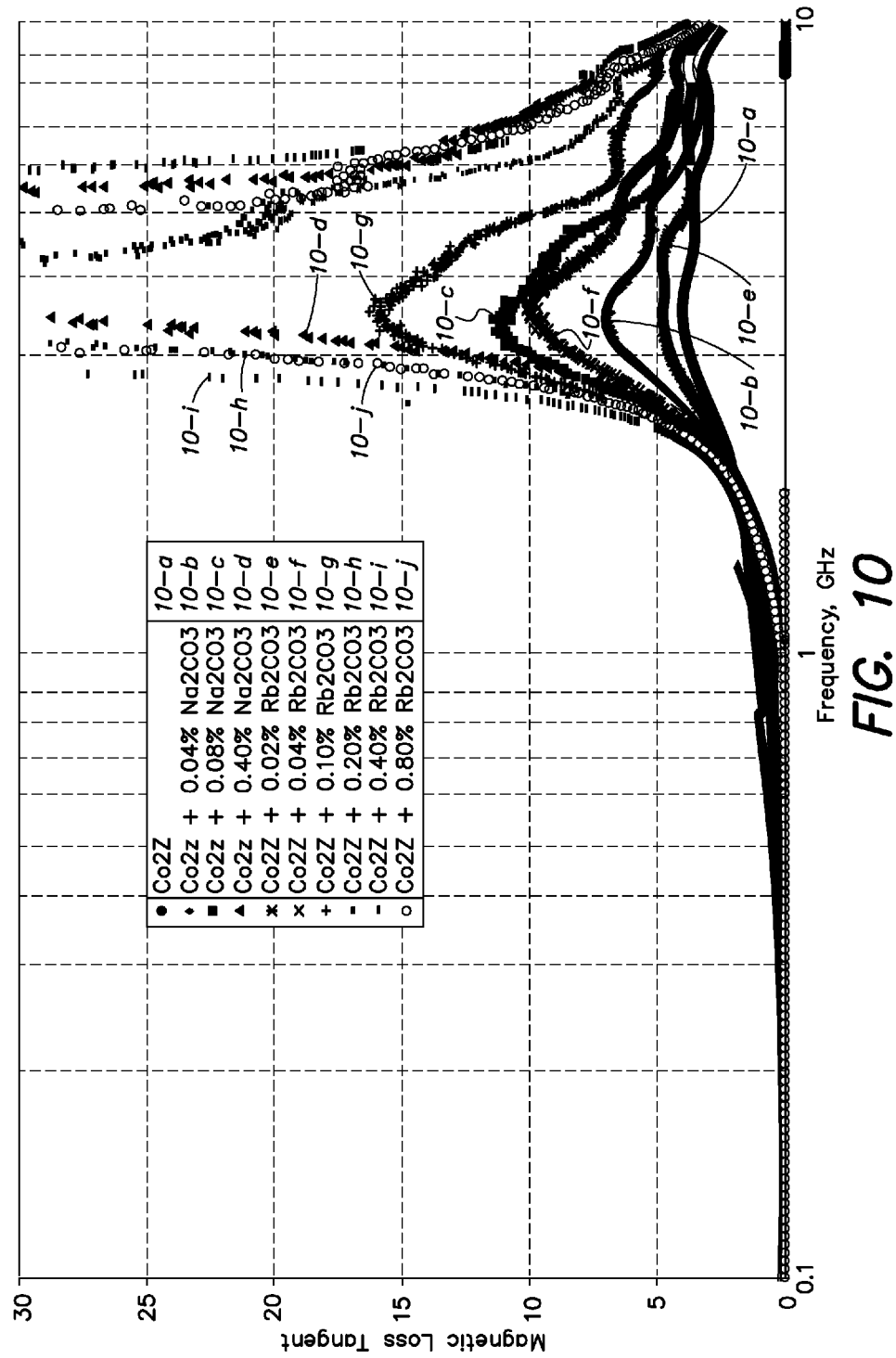
FIG. 10 is a graph showing the magnetic loss tangent as a function of frequency for sodium and rubidium doped hexaferrites at several doping levels according to one or more aspects of the present invention.

FIGS. 9 and 10 illustrate the ratio of $\mu''$ to $\mu'$, a quantity also known as the magnetic loss tangent (Tan $\delta$ M) versus frequency for potassium carbonate (FIG. 9), sodium carbonate, and rubidium carbonate doped $Co_2Z$ (FIG. 10). This parameter represents the amount of magnetic energy lost versus stored in a material exposed to electromagnetic radiation. It may be desirable for some electrical devices utilizing magnetic ferrite materials such as, for example, inductors and transformers, to operate in a frequency regime where the magnetic loss tangent for the magnetic ferrite material is low. In these figures, the data sets obtained from the analysis of $Co_2Z$ doped with 0 wt. %, 0.06 wt. %, 0.12 wt. %, 0.6 wt. %, 1.2 wt. %, and 3.6 wt. % potassium carbonate, in FIG. 9, are designated by lines 9-a through 9-f, respectively, the data sets obtained from the analysis of $Co_2Z$ doped with 0 wt. %, 0.04 wt. %, 0.08 wt. %, and 0.4 wt. % sodium carbonate, in FIG. 10, are designated by lines 10-a through 10-d, respectively, and the data sets obtained from the analysis of $Co_2Z$ doped with 0.02 wt. %, 0.04 wt. %, 0.1 wt %, 0.2 wt. %, 0.4 wt. %, and 0.8 wt. % rubidium carbonate, in FIG. 10, are designated by lines 10-e through 10-j, respectively.

As can be seen in FIGS. 9 and 10, the magnetic loss tangent for alkali metal doped $Co_2Z$ is approximately the same as or lower than that of un-doped $Co_2Z$ up to a frequency of approximately 2 GHz, where the magnetic loss tangent for the doped and un-doped materials approaches approximately 2. This, along with the data illustrated in FIGS. 2a-5 shows that alkali metal doped $Co_2Z$ may facilitate the operation of high frequency devices utilizing ferrite materials at frequencies higher than un-doped $Co_2Z$ (e.g., up to about 1.4 GHz for potassium doped $Co_2Z$) while exhibiting energy losses no greater than un-doped $Co_2Z$.

Effect of Potassium Carbonate Doping on Permeability to Permittivity Ratio $\mu_r/\epsilon_r$ A possible application of ferrite materials is in the construction of high frequency RF or microwave antennas. Generally, antennas are most effective at absorbing and emitting electromagnetic energy into the atmosphere at frequencies where the real component of the relative magnetic permeability and the real component of the relative electrical permittivity of their materials of construction are equal (i.e., $\mu_r/\epsilon_r=1$). This ratio is referred to as the "permeability to permittivity ratio" herein.

Figure 11:
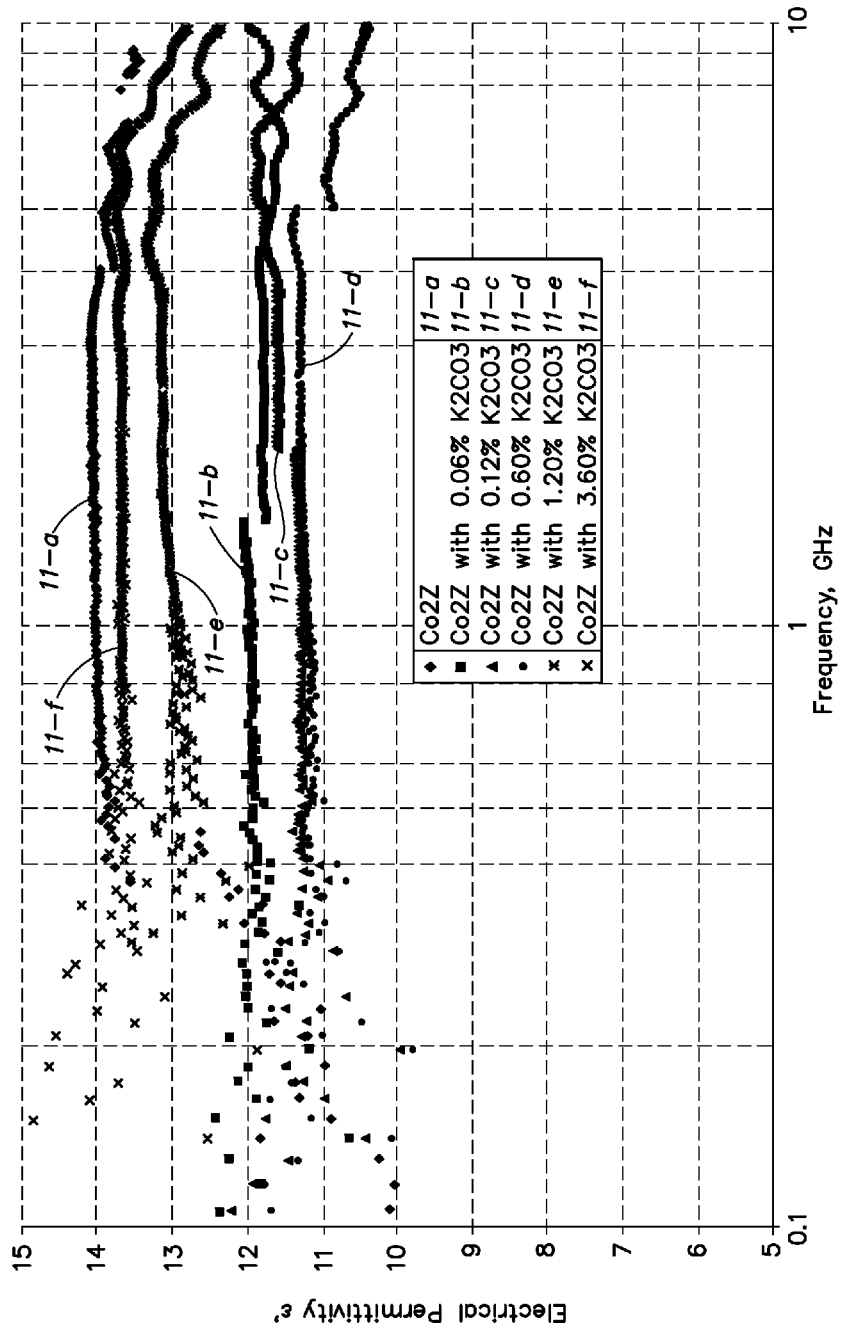
FIG. 11 is a graph showing the real component of relative electrical permittivity as a function of frequency for potassium doped hexaferrites at several doping levels according to one or more aspects of the present invention.
Figure 12:
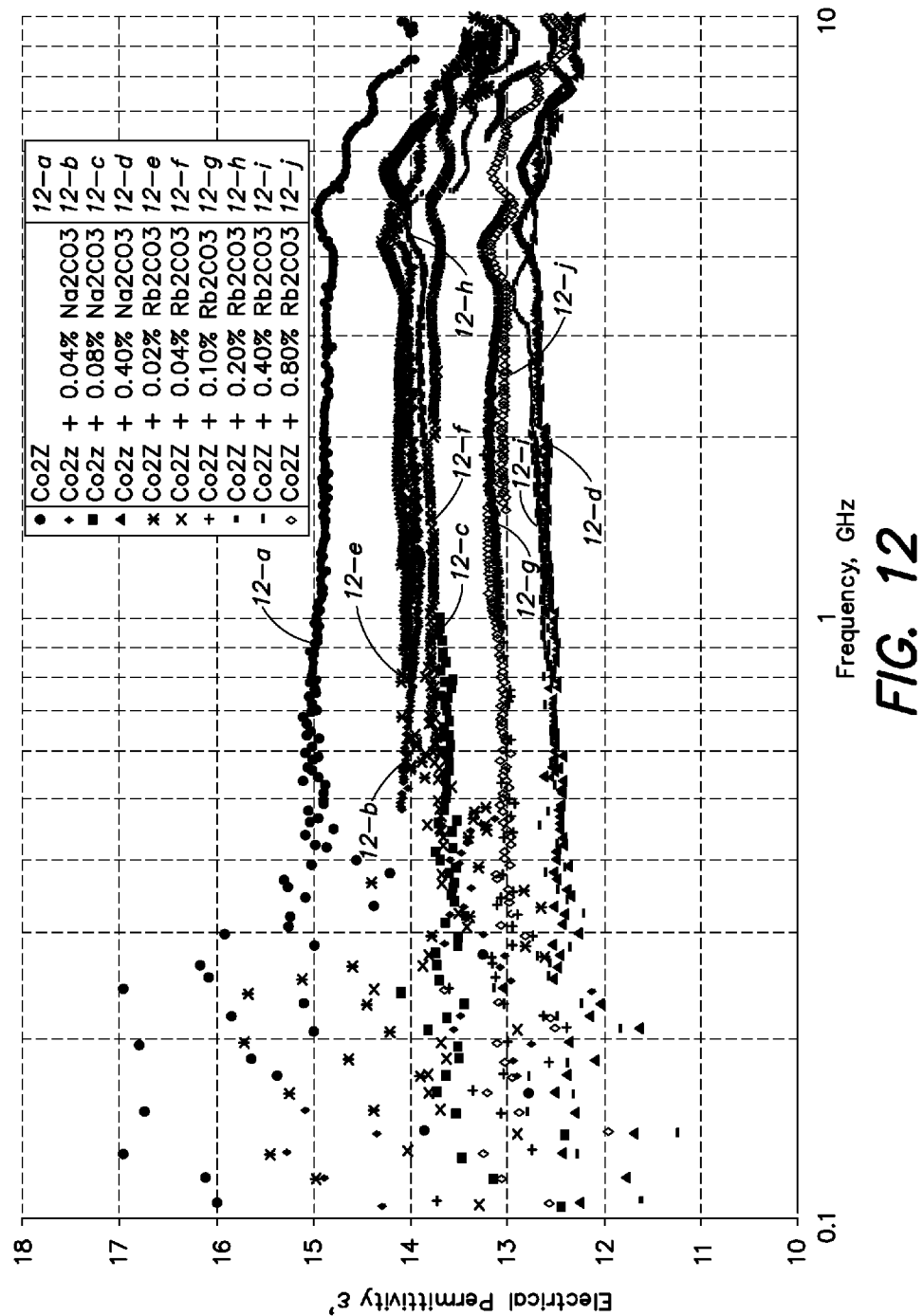
FIG. 12 is a graph showing the real component of relative electrical permittivity as a function of frequency for sodium and rubidium doped hexaferrites at several doping levels according to one or more aspects of the present invention.

FIGS. 11 and 12, illustrate the real component of relative electrical permittivity versus frequency for various alkali metal doped $Co_2Z$ based materials. In these figures, the data sets obtained from the analysis of $Co_2Z$ doped with 0 wt. %, 0.06 wt. %, 0.12 wt. %, 0.6 wt. %, 1.2 wt. %, and 3.6 wt. % potassium carbonate. In FIG. 11, are designated by lines 11-a through 11-f, respectively, the data sets obtained from the analysis of $Co_2Z$ doped with 0 wt. %, 0.04 wt. %, 0.08 wt. %, and 0.4 wt. % sodium carbonate (FIG. 12) are designated by lines 12-a through 12-d, respectively, and the data sets obtained from the analysis of $Co_2Z$ doped with 0.02 wt. %, 0.04 wt. %, 0.1 wt %, 0.2 wt. %, 0.4 wt. %, and 0.8 wt. % rubidium carbonate (FIG. 12) are designated by lines 12-e through 12-j, respectively.

As illustrated in FIGS. 11 and 12, alkali metal doped $Co_2Z$ based material may exhibit a real component of relative electrical permittivity between about 10 and 15 at frequencies in the 0.5 GHz to 1 GHz range. In most cases, this is slightly higher than the values of the real components of the relative magnetic permeabilities illustrated in FIGS. 2a-4-b at frequencies in this range. Table 1 below illustrates the real component of the relative magnetic permeability and the real component of the relative electrical permittivity at the exemplary frequency of 1 GHz for potassium doped $Co_2Z$.

TABLE 1

| Doping Level (wt % $K_2CO_3$) | Equivalent wt. % doping of $K_2O$ | $\mu_r$ | $\epsilon_r$ | $\mu_r/\epsilon_r$ |
| --- | --- | --- | --- | --- |
| 0 | 0 | 9.3 | 13.9 | 0.67 |
| 0.06 | 0.04 | 10.2 | 11.9 | 0.86 |
| 0.12 | 0.08 | 10.1 | 11.2 | 0.90 |
| 0.6 | 0.41 | 10.7 | 11.1 | 0.96 |
| 1.2 | 0.82 | 11.8 | 12.9 | 0.91 |
| 3.6 | 2.45 | 7.0 | 13.6 | 0.51 |

The above data show that potassium doped $Co_2Z$ may exhibit a $\mu_r/\epsilon_r$ ratio of about 0.9 at 1 GHz, very close to the ratio of 1.0 which would characterize a highly efficient antenna. The absolute level of the real component of the magnetic permeability of doped $Co_2Z$ materials may be adjusted, for example by changing the orientation of the crystal structure of the material in an antenna, or by forming the doped $Co_2Z$ in a method where it is exposed to a magnetic field during one or more steps, thus increasing the alignment of the magnetic moments of the magnetic domains of the material. The magnetic permeability of doped $Co_2Z$ materials may also be increased by adjusting the heat treatment/sintering steps that may be used to form the material to increase the material density and/or grain size. In addition, the absolute level of the magnetic permeability and/or electrical permittivity may be adjusted by additional doping with one or more divalent metal ions, such as, for example, Sr, Mg, Cu, Ni, Mn, and Zn, or by combining a doped hexaferrite with a ferromagnetic material, a ferroelectric material, or a dielectric to form a composite material, as discussed above. Thus, it is feasible to utilize potassium doped $Co_2Z$ materials according to one or more aspects of the present invention for a highly efficient high frequency (e.g., 1 GHz) antenna.

Effect of Sodium Carbonate and Rubidium Carbonate Doping on Permeability to Permittivity Ratio $\mu_r/\epsilon_r$ Table 2 below illustrates the real component of the relative magnetic permeability and relative electrical permittivity at the exemplary frequency of 0.5 GHz of sodium doped $Co_2Z$, and Table 3 below illustrates the real component of the relative magnetic permeability and relative electrical permittivity at the exemplary frequency of 0.5 GHz of rubidium doped $Co_2Z$. The frequencies at which this data is compared was reduced versus that in Table 1 for potassium doped $Co_2Z$ material to correspond to points below the resonant frequencies of the sodium and rubidium doped materials, which are in general lower than that for the potassium doped materials. These tables illustrate that both the sodium and rubidium doped $Co_2Z$ based materials also exhibit high $\mu_r/\epsilon_r$ ratios (e.g., above about 0.8) at 0.5 GHz for at least some concentrations of dopant.

TABLE 2

| Doping Level (wt % $Na_2CO_3$) | Equivalent wt. % doping of $Na_2O$ | $\mu_r$ | $\epsilon_r$ | $\mu_r/\epsilon_r$ |
|---|---|---|---|---|
| 0.04 | 0.02 | 12.8 | 14.1 | 0.90 |
| 0.08 | 0.05 | 10.9 | 13.6 | 0.80 |
| 0.40 | 0.23 | 9.7 | 12.5 | 0.78 |

TABLE 3

| Doping Level (wt % $Rb_2CO_3$) | Equivalent wt. % doping of $Rb_2O$ | $\mu_r$ | $\epsilon_r$ | $\mu_r/\epsilon_r$ |
|---|---|---|---|---|
| 0.02 | 0.02 | 13.5 | 13.2 | 1.02 |
| 0.04 | 0.03 | 11.9 | 13.6 | 0.88 |
| 0.10 | 0.08 | 10.5 | 13.0 | 0.81 |
| 0.20 | 0.16 | 10.4 | 13.6 | 0.76 |
| 0.40 | 0.32 | 10.6 | 12.5 | 0.85 |
| 0.80 | 0.65 | 10.4 | 13.0 | 0.80 |

Figure 13:
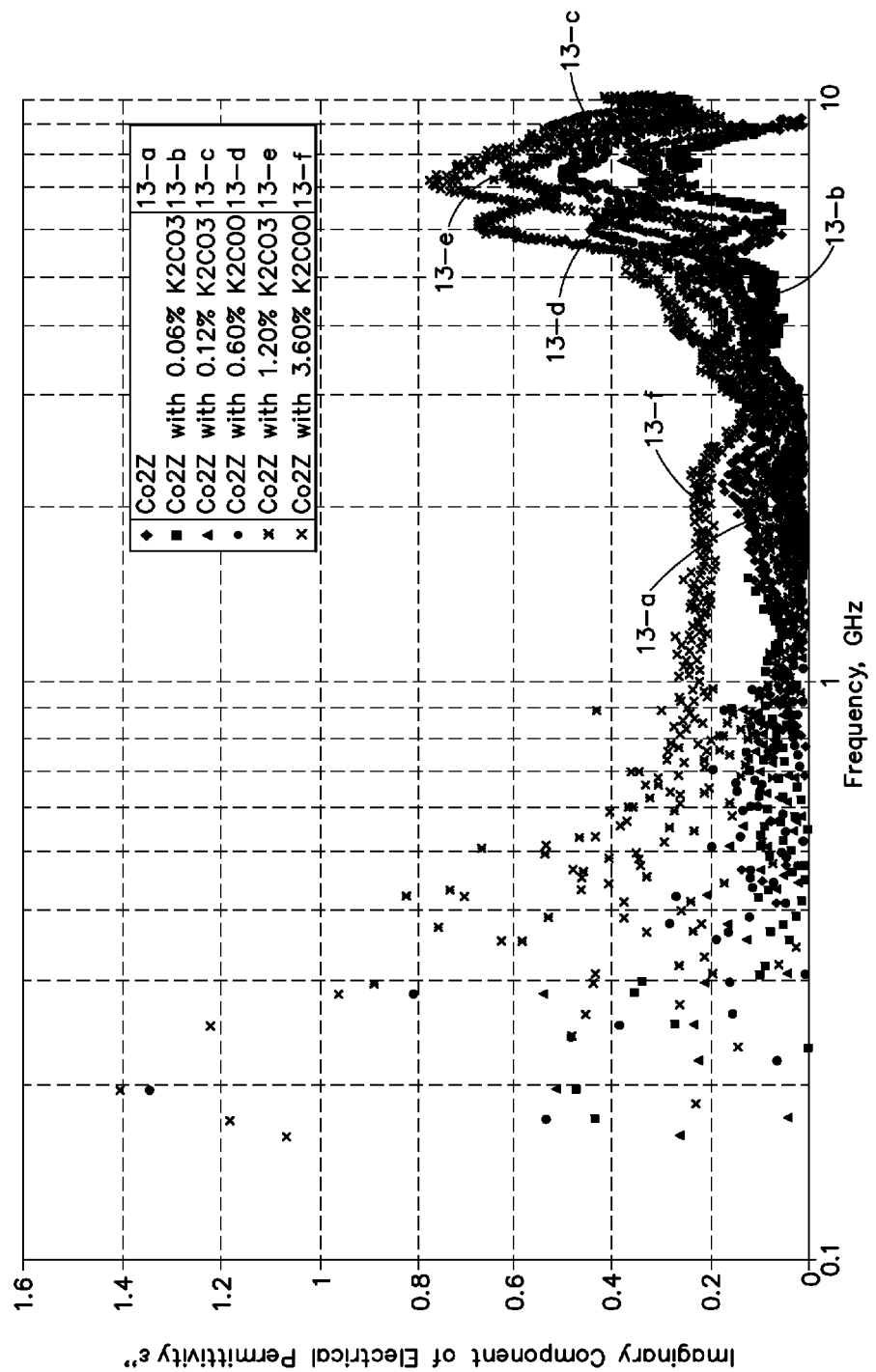
FIG. 13 is a graph showing the imaginary component of relative electrical permittivity as a function of frequency for potassium doped hexaferrites at several doping levels according to one or more aspects of the present invention.

Effect of Potassium Carbonate Doping on Imaginary Component of Electrical Permittivity FIG. 13 illustrates the imaginary component of the electrical permittivity of potassium carbonate doped $Co_2Z$ based material versus frequency. In this figure, the data sets obtained from the analysis of the $Co_2Z$ samples doped with 0 wt. %, 0.06 wt. %, 0.12 wt. %, 0.6 wt. %, 1.2 wt. %, and 3.6 wt. % potassium carbonate are designated by lines 13-a through 13-f, respectively. Although the data for each of the materials overlapped to a significant extent and varied significantly with frequency, there appeared to be a small overall increase in the imaginary component of the electrical permittivity with increased potassium carbonate doping.

Effect of Potassium Carbonate Doping on Electrical Loss Tangent

Figure 14:
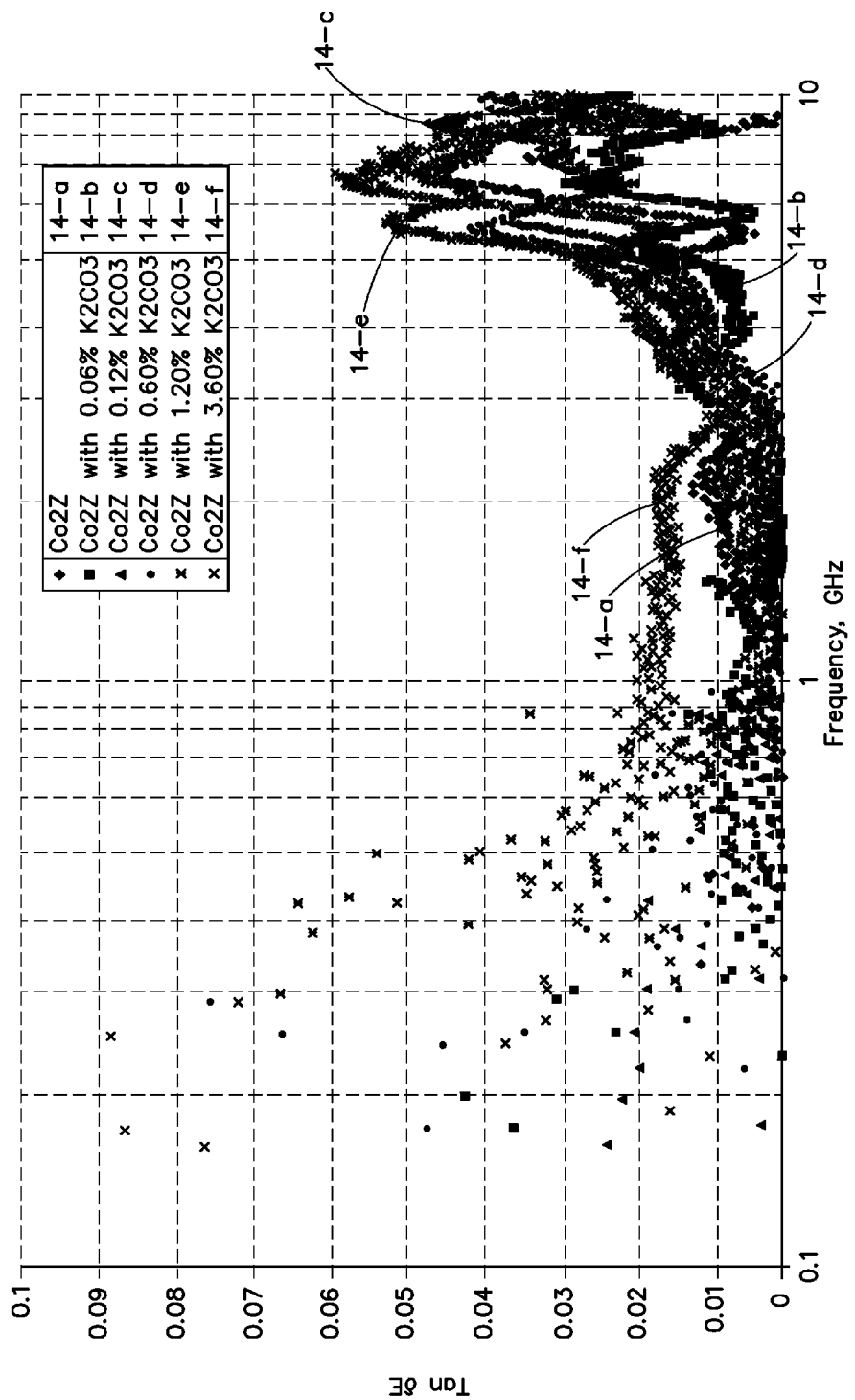
FIG. 14 is a graph showing the electrical loss tangent as a function of frequency for potassium doped hexaferrites at several doping levels according to one or more aspects of the present invention.

FIG. 14 illustrates the electrical loss tangent (Tan $\delta\in$) of the potassium carbonate doped $Co_2Z$ based material samples versus frequency. In this figure, the data sets obtained from the analysis of $Co_2Z$ doped with 0 wt. %, 0.06 wt. %, 0.12 wt. %, 0.6 wt. %, 1.2 wt. %, and 3.6 wt. % potassium carbonate are designated by lines 14-a through 14-f, respectively. Although the data for each of the materials overlapped to a significant extent and varied significantly with frequency, there appeared to be a small overall increase in the electrical loss tangent with increased potassium carbonate doping. In some aspects, a high electrical loss tangent may be undesirable. A high electrical loss tangent may be adjusted by annealing and/or by the addition of other dopants or by combining the doped $Co_2Z$ with other materials to form a composite material with the desired properties.

Devices designed to operate at high frequencies that include ferrite materials that could have their operating frequency range increased by the inclusion of doped $Co_2Z$ materials according to aspects of the present invention include, but are not limited to, antennae, ferrite circulators, isolators, inductors (including multi layer chip inductors), multi layer chip beads, and transformers. New devices such as these could be fabricated using doped $Co_2Z$ materials according to aspects of the present invention, or existing devices utilizing some other ferrite might be retrofitted to replace at least a portion of the original ferrite material with a doped $Co_2Z$ material according to one or more aspects of the present invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An electrical component comprising $Ba_{3-y}M_xCo_2Fe_{24}O_{41}$ where Ba is barium, M is at least one of potassium and rubidium, Co is cobalt, Fe is iron, O is oxygen, x is greater than zero and less than one, and y is greater than zero and less than or equal to x.

2. The electrical component of claim 1 wherein the $Ba_{3-y}M_xCo_2Fe_{24}O_{41}$ has an average grain diameter in a range of between about 5 micrometers and about 1 millimeter.

3. The electrical component of claim 2 wherein the $Ba_{3-y}M_xCo_2Fe_{24}O_{41}$ comprises a Z-type ferrite.

4. The electrical component of claim 3 wherein the at least one of the potassium and rubidium is included in an amount sufficient to provide an increased frequency corresponding to a peak of a real component of magnetic permeability of the $Ba_{3-y}M_xCo_2Fe_{24}O_{41}$ relative to $Ba_3Co_2Fe_{24}O_{41}$ not including the at least one of the potassium and rubidium.

5. The electrical component of claim 4 wherein the at least one of the potassium and rubidium is included in an amount sufficient to provide an increased frequency corresponding to a peak of an imaginary component of magnetic permeability of the $Ba_{3-y}M_xCo_2Fe_{24}O_{41}$ relative to $Ba_3Co_2Fe_{24}O_{41}$ not including the at least one of the potassium and rubidium.

6. The electrical component of claim 5 wherein the at least one of the potassium and rubidium is included in an amount sufficient to provide an increased a permeability to permittivity ratio $\mu_r/\epsilon_r$ of the $Ba_{3-y}M_xCo_2Fe_{24}O_{41}$ at a frequency of at least one of about 0.5 GHz and about 1 GHz relative to $Ba_3Co_2Fe_{24}O_{41}$ not including the at least one of the potassium and rubidium.

7. The electrical component of claim 6 wherein the at least one of the potassium and rubidium is included in an amount sufficient to provide the $Ba_{3-y}M_xCo_2Fe_{24}O_{41}$ with a permeability to permittivity ratio $\mu_r/\in_r$ of greater than about 0.8 at a frequency of at least one of about 0.5 GHz and about 1 GHz.

8. The electrical component of claim 7 wherein the at least one of the potassium and rubidium is included in an amount sufficient to impart the $Ba_{3-y}M_xCo_2Fe_{24}O_{41}$ with a real component of relative magnetic permeability greater than about 10 at a frequency above 1 GHz.

9. The electrical component of claim 8 wherein the at least one of the potassium and rubidium is included in an amount sufficient to impart the $Ba_{3-y}M_xCo_2Fe_{24}O_{41}$ with a resonant frequency greater than 1 GHz.

10. The electrical component of claim 1 wherein the at least one of the potassium and rubidium is included in an amount sufficient to increase a frequency corresponding to a peak of a real component of magnetic permeability of the $Ba_{3-y}M_xCo_2Fe_{24}O_{41}$ relative to $Ba_3Co_2Fe_{24}O_{41}$ not including the at least one of the potassium and rubidium.

11. The electrical component of claim 1 wherein an amount of the at least one of the potassium and rubidium is sufficient to provide an increased frequency corresponding to a peak of an imaginary component of magnetic permeability of the $Ba_{3-y}M_xCo_2Fe_{24}O_{41}$ relative to $Ba_3Co_2Fe_{24}O_{41}$ not including the at least one of the potassium and rubidium.

12. The electrical component of claim 1 wherein the at least one of the potassium and rubidium is included in an amount sufficient to provide an increased permeability to permittivity ratio $\mu_r/\in_r$ of the $Ba_{3-y}M_xCo_2Fe_{24}O_{41}$ at a frequency of at least one of about 0.5 GHz and about 1 GHz relative to $Ba_3Co_2Fe_{24}O_{41}$ not including the at least one of the potassium and rubidium.

13. The electrical component of claim 12 wherein the at least one of the potassium and rubidium is included in an amount sufficient to provide the $Ba_{3-y}M_xCo_2Fe_{24}O_{41}$ with a permeability to permittivity ratio $\mu_r/\in_r$ of greater than about 0.8 at a frequency of at least one of about 0.5 GHz and about 1 GHz.

14. The electrical component of claim 1 wherein the at least one of the potassium and rubidium is included in an amount sufficient to impart the $Ba_{3-y}M_xCo_2Fe_{24}O_{41}$ with a real component of relative magnetic permeability at a frequency above 1 GHz greater than that of $Ba_3Co_2Fe_{24}O_{41}$ not including the at least one of the potassium and rubidium.

15. The electrical component of claim 14 wherein the at least one of the potassium and rubidium is included in an amount sufficient to impart the $Ba_{3-y}M_xCo_2Fe_{24}O_{41}$ with a real component of relative magnetic permeability greater than about 10 at a frequency above 1 GHz.

16. The electrical component of claim 1 wherein the at least one of the potassium and rubidium is included in an amount sufficient to impart the $Ba_{3-y}M_xCo_2Fe_{24}O_{41}$ with a resonant frequency greater than that of $Ba_3Co_2Fe_{24}O_{41}$ not including the at least one of the potassium and rubidium.

17. The electrical component of claim 1 wherein M further includes sodium.

18. The electrical component of claim 17 wherein the at least one of the potassium and rubidium is included in an amount sufficient to impart the $Ba_{3-y}M_xCo_2Fe_{24}O_{41}$ with a resonant frequency greater than 1 GHz.

19. The electrical component of claim 1 wherein the electrical component is a radio frequency ferrite circulator.

20. The electrical component of claim 19 wherein the radio frequency ferrite circulator is configured as an isolator.

21. The electrical component of claim 1 wherein the electrical component is any one of an inductor, a transformer, and an antenna.

* * * * *